(12) United States Patent
Fujii et al.

(10) Patent No.: US 7,042,541 B2
(45) Date of Patent: May 9, 2006

(54) LIQUID CRYSTAL DISPLAY APPARATUS AND PRODUCTION METHOD THEREOF

(75) Inventors: Toshio Fujii, Tsu (JP); Naofumi Kondo, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 78 days.

(21) Appl. No.: 10/667,973

(22) Filed: Sep. 23, 2003

(65) Prior Publication Data

US 2004/0141144 A1      Jul. 22, 2004

(30) Foreign Application Priority Data

Sep. 24, 2002  (JP)  ............................ P2002-277922
Aug. 4, 2003   (JP)  ............................ P2003-286175

(51) Int. Cl.
    *G02F 1/1333*    (2006.01)

(52) U.S. Cl. ........................................ 349/138; 349/110
(58) Field of Classification Search ................ 349/110, 349/113, 129, 130, 106, 43, 114, 138
    See application file for complete search history.

(56) References Cited

U.S. PATENT DOCUMENTS

| | | | |
|---|---|---|---|
| 5,583,671 A | 12/1996 | Yoshida et al. | |
| 5,905,552 A | 5/1999 | Yoshida et al. | |
| 6,275,274 B1 | 8/2001 | Kanemori et al. | |
| 6,593,982 B1 * | 7/2003 | Yoon et al. | 349/106 |
| 6,831,709 B1 * | 12/2004 | Yamada et al. | 349/44 |

FOREIGN PATENT DOCUMENTS

| | | |
|---|---|---|
| KR | B 0188131 | 6/1999 |
| KR | A 2001-0105484 | 11/2001 |

OTHER PUBLICATIONS

Bahadur, Liquid Crystals 1990, World Scientific, vol. 1, pp. 178-188.*

(Continued)

*Primary Examiner*—Kenneth Parker
*Assistant Examiner*—David Chung
(74) *Attorney, Agent, or Firm*—Nixon & Vanderhye P.C.

(57) ABSTRACT

A liquid crystal display apparatus is produced by the steps of arranging pixel electrodes, TFT devices and signal wiring on one surface of one substrate, arranging a transparent layer on a portion of one surface of a transparent substrate which portion is to be a display portion, bonding the one substrate and the transparent substrate to each other while the one surface having the pixel electrodes formed thereon faces the one surface having the transparent layer formed thereon, and injecting a liquid crystal between the substrates to form a liquid crystal layer. A fluidization path of the liquid crystal can be secured in a non-display portion, too, in which the TFT devices and the signal wiring are disposed when the liquid crystal is injected. Therefore, it is possible to shorten the injection time by increasing the liquid crystal injection speed and to improve productivity.

18 Claims, 26 Drawing Sheets

OTHER PUBLICATIONS

"The Latest Liquid Crystal Application Technologies" edited by Liquid Crystal Technology Research Society, published by K. K. Kogyo Chosakai, Dec. 15, 1994, pp. 3-6 and partial English translation thereof.
Chinese Office Action mailed Jul. 15, 2005.
CN 1086908 A dated May 18, 1994 (U.S. counterparts 5,583,671 and 5,905,552 listed above).
CN 1218199 A dated Jun. 2, 1999 (U.S. counterpart 6,275,274 listed above).
Korean Office Action mailed Jul. 25, 2005.

* cited by examiner

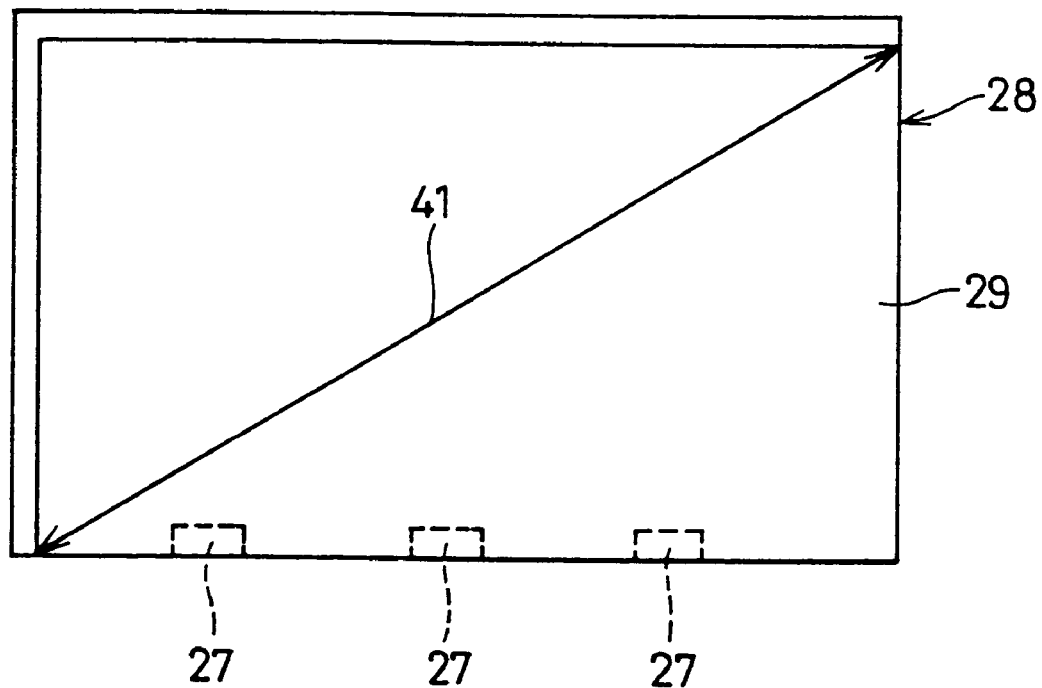

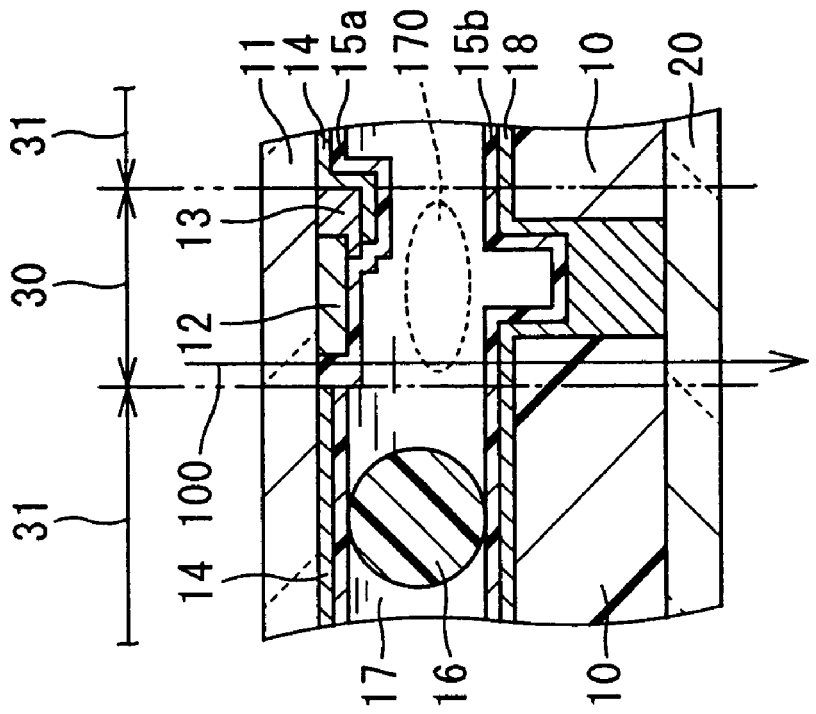
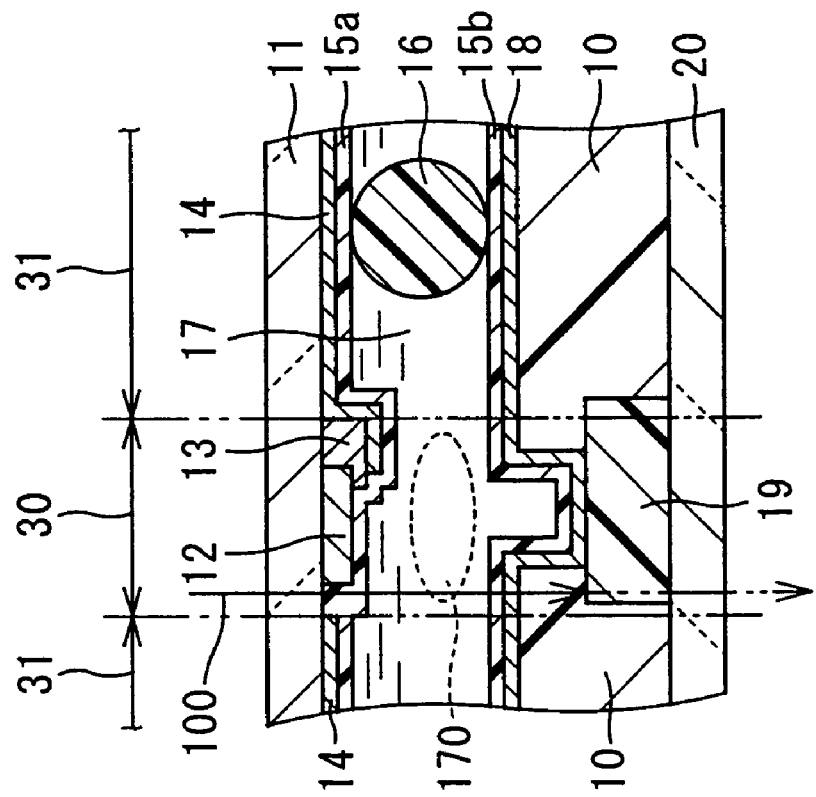

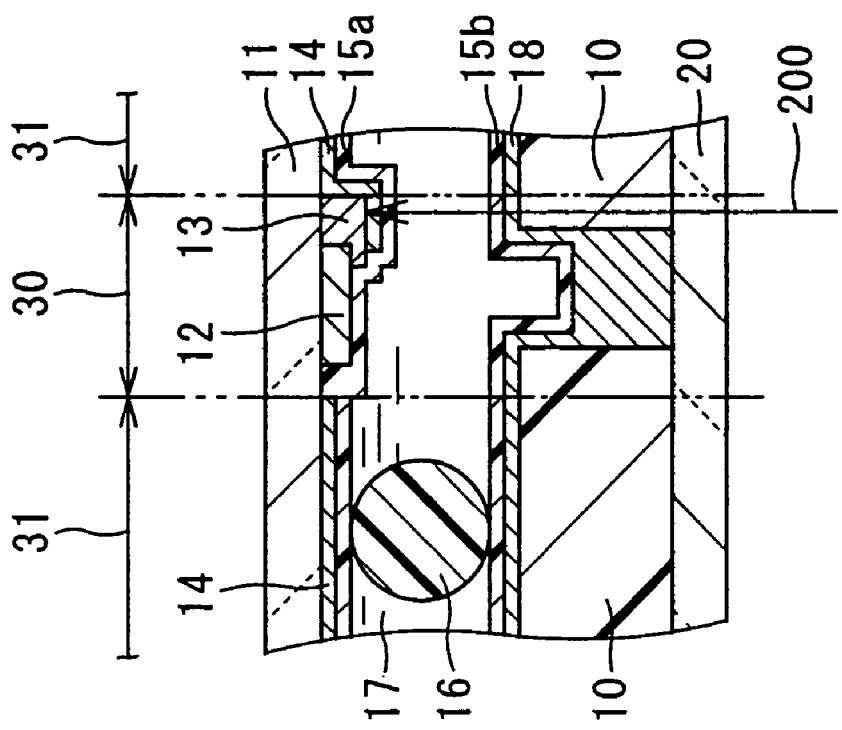
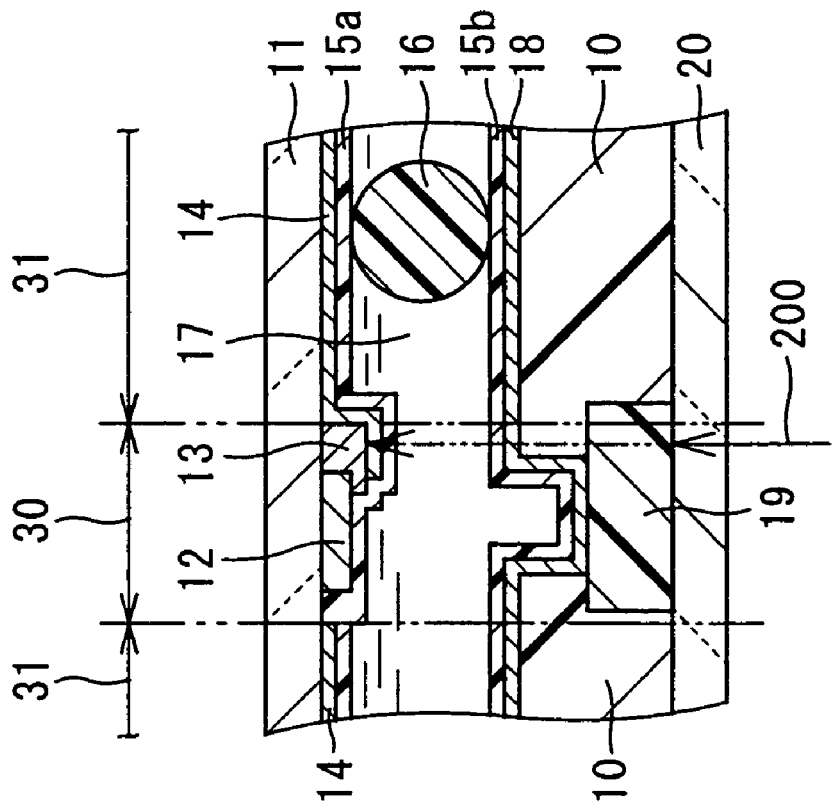

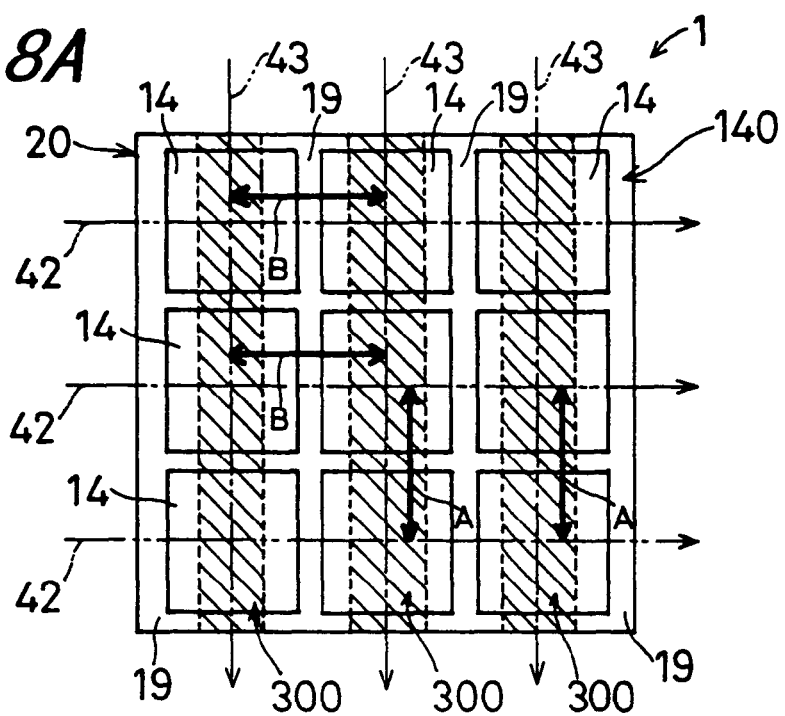
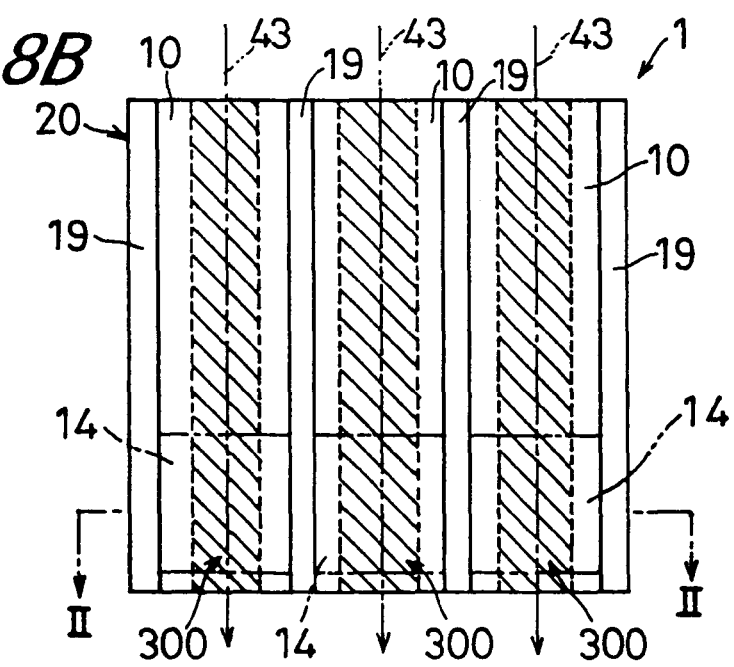
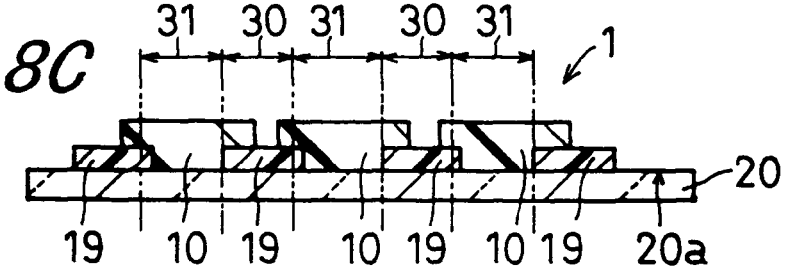
FIG. 8A
FIG. 8B
FIG. 8C

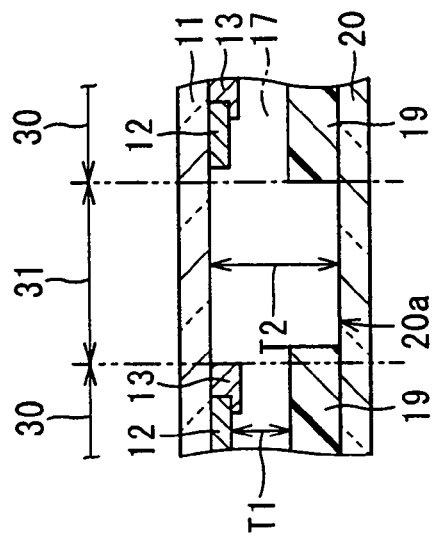
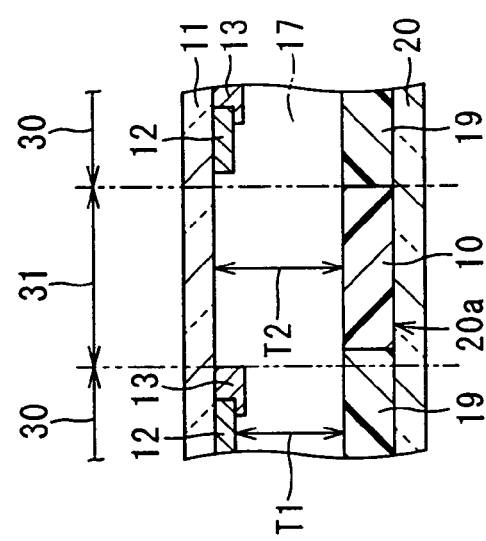
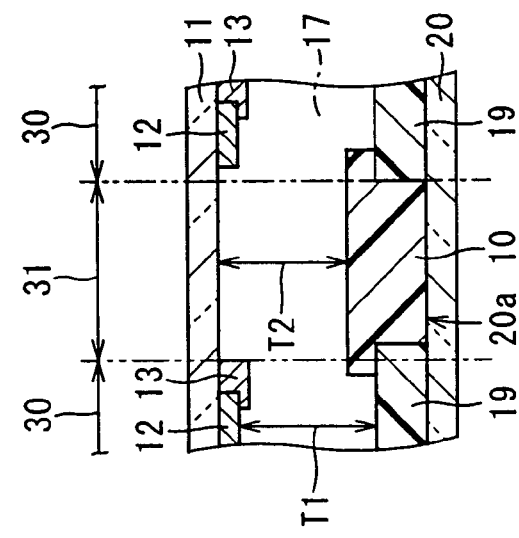

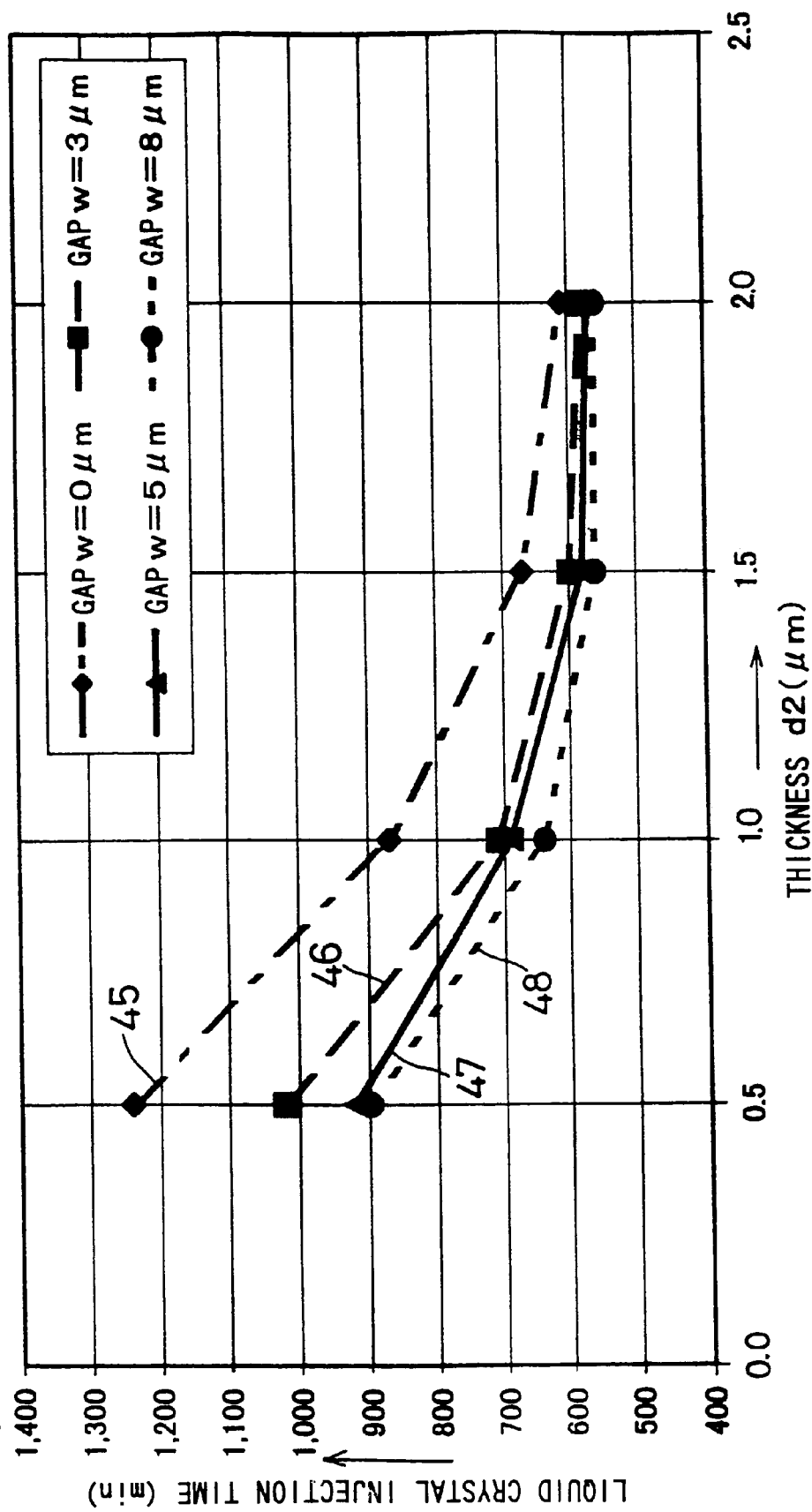

LIQUID CRYSTAL DISPLAY APPARATUS AND PRODUCTION METHOD THEREOF

BACKGROUND OF THE INVENTION

1. Field of the Invention

The invention relates to a liquid crystal display apparatus and a production method thereof.

2. Description of Related Art

A liquid crystal display apparatus is a display device that applies a voltage to a liquid crystal layer sandwiched between a pair of substrates to change orientation of liquid crystal molecules, and displays black-and-white or color characters or images by utilizing the change of light transmission characteristics of the liquid crystal layer resulting from the change of the molecular orientation.

FIG. 40 is a schematic sectional view showing a simplified construction of a black-and-white liquid crystal display apparatus 5 according to the prior art.

The liquid crystal display apparatus 5 includes an opposing substrate 51, a transparent substrate 60 and a liquid crystal layer 57 that is formed by injecting a liquid crystal between the opposing substrate 51 and the transparent substrate 60. A shading film 59, a thin film electrode 58 and an orientation film 55a are formed on the transparent substrate 60. Signal wiring 52, driving devices 53 such as thin film transistors (abbreviated as "TFT"), pixel electrodes 54 and an orientation film 55b are formed on the opposing substrate 51. A spacer 56 formed of glass or plastic is sandwiched between the opposing substrate 51 and the transparent substrate 60 to secure a predetermine gap between the opposing substrate 51 and the transparent substrate 60. The spacer 56 is sprayed onto either one of the opposing substrate 51 and the transparent substrate 60. Alternatively, the spacer 56 is formed on either one of the opposing substrate 51 and the transparent substrate 60 by photolithography (refer to "The Latest Liquid Crystal Application Technologies", edited by Liquid Crystal Application Technology Research Society, published by K.K. Kogyo Chosakai, Dec. 15, 1994, p 3–6).

As shown in FIG. 40, the signal wiring 52, the driving device 53 and the shading film 59 are formed in a non-display portion 70 not used for display in the liquid crystal display apparatus 5 in such a fashion as to protrude towards the liquid crystal layer 57. Therefore, a gap h1 defined by the orientation films 55 opposing each other in the non-display portion 70 is remarkably small and is smaller than a gap h2 defined by the orientation films 55 opposing each other in a display portion 71 used for display (h1<h2). Therefore, the signal wiring 52, the driving device 53 and the shading film 59 operate as a barrier in the non-display portion 70 when the liquid crystal is injected between the opposing substrate 51 and the transparent substrate 60 during the fabrication process of the liquid crystal display apparatus 5. Because this barrier impedes fluidization of the liquid crystal and makes a fluidization path of the liquid crystal smaller, the liquid crystal cannot be injected smoothly and an injection speed of the liquid crystal drops, so that a long time is necessary to inject the liquid crystal.

As the thickness of the liquid crystal display apparatus has become smaller and smaller in recent years, the gap between the opposing substrate 51 and the transparent substrate 60 has become smaller, and the gap h1 of the non-display portion 70 described above has become smaller, too. Consequently, the fluidization path of the liquid crystal in the non-display portion 70 has become smaller and the injection speed drops, thereby rendering a serious problem that the injection time remarkably increases.

As the liquid crystal display apparatus has become greater in size, the number of pixels has become greater, and the adverse influences of the small gap h1 of the non-display portion 70 have become greater. In some cases, it has become difficult to inject the liquid crystal into the liquid crystal display apparatus as a whole.

SUMMARY OF THE INVENTION

It is an object of the invention to provide an liquid crystal display apparatus in which shortening an injection time of a liquid crystal by increasing an injection speed of the liquid crystal, improving productivity and accomplishing a large-scale liquid crystal display apparatus can be realized, and a method for producing the same.

The invention provides a liquid crystal display apparatus comprising a first substrate having on one surface thereof a plurality of pixel electrodes for driving a liquid crystal, a plurality of driving devices so arranged as to correspond to the pixel electrodes, respectively, for controlling a potential of the pixel electrodes, and wiring electrically connected to the driving devices; a second substrate so arranged as to oppose the first substrate while facing the one surface of the first substrate having the pixel electrodes thereon; and a liquid crystal layer formed by injecting the liquid crystal between the first and second substrates, wherein the first substrate has a non-display portion in which the driving devices and the wiring are disposed and which is not used for display and a display portion which is a portion other than the non-display portion and is used for display, and the second substrate has a transparent layer disposed on at least a portion of a surface thereof which surface faces the first substrate, the portion corresponding to the display portion out of the display portion and the non-display portion.

The liquid crystal display apparatus according to the invention includes a first substrate having on one surface thereof a plurality of pixel electrodes for driving a liquid crystal, a plurality of driving devices so arranged as to correspond to the pixel electrodes, respectively, for controlling a potential of the pixel electrodes, and wiring electrically connected to the driving devices; a second substrate so arranged as to oppose the first substrate while facing the one surface of the first substrate having the pixel electrodes thereon; and a liquid crystal layer formed by injecting the liquid crystal between the first and second substrates, wherein the first substrate has a non-display portion in which the driving devices and the wiring are disposed and which is not used for display and a display portion which is a portion other than the non-display portion and is used for display, and the second substrate has a transparent layer disposed on at least a portion of a surface thereof which surface faces the first substrate, the portion corresponding to the display portion. According to this construction, a thickness t1 of the liquid crystal layer as at least a part of the non-display portion can be increased without changing a thickness t2 of the liquid crystal layer of the display portion.

When the second substrate does not have the transparent layer on its surface corresponding to the display portion and facing the first substrate, the thickness t1 of the liquid crystal layer of the non-display portion depends on the thickness t2 of the liquid crystal layer of the display portion. To increase the thickness t1, the thickness t2 must be increased. In other words, the thickness t1 cannot be increased without changing the thickness t2. When the thickness t2 is increased so as to increase the thickness t1, however, a long time is necessary for injecting the liquid crystal, since the amount of the liquid crystal to be injected between the first substrate and the second substrate is increased. When the thickness t2 becomes excessively great, it becomes difficult to make the thickness t2 uniform throughout the liquid crystal display apparatus as a whole, and display defect occurs.

The liquid crystal display apparatus according to the invention has the transparent layer on at least the surface of the second substrate of the display portion facing the first substrate as described above. Therefore, even when the gap between the first substrate and the second substrate is enlarged to increase the thickness t1, the increment of the thickness t2 can be made smaller than the increment of the gap between the first and second substrates by adjusting the thickness of the transparent layer. In other words, the thickness t1 can be increased without changing the thickness t2, and can be increased to the thickness t1 greater than the thickness t2. It is therefore possible to increase the sectional area on the surface of the liquid crystal layer of the non-display portion substantially perpendicular to the first and second substrates, to secure a fluidization path of the liquid crystal in the non-display portion in which the driving devices and the wiring are disposed when the liquid crystal is injected between the first and second substrates, and to lower the fluidization resistance. Therefore, a liquid crystal display apparatus in which the liquid crystal injection speed is high and the injection time is short during production and which has high productivity can be acquired. A large-scale liquid crystal display apparatus can be accomplished, too.

In the invention it is preferable that a thickness t1 of the liquid crystal layer of at least a part of the non-display portion is 0.48 times or more of a thickness t2 of the liquid crystal layer of the display portion (t1γ0.48t2).

According to the invention, the thickness t1 of the liquid crystal layer of at least a part of the non-display portion is at least 0.48 times the thickness t2 of the liquid crystal layer of the display portion (t1γ0.48t2). It is therefore possible to secure the fluidization path of the liquid crystal in the non-display portion in which the driving devices and the wiring are disposed at the time of injection of the liquid crystal between the first substrate and the second substrate, and to lower the fluidization resistance. Therefore, a liquid crystal display apparatus in which the liquid crystal injection speed is high and the injection time is short during production and which has high productivity can be acquired. A large-scale liquid crystal display apparatus can be accomplished, too.

In the invention it is preferable that the transparent layer is formed of a resin.

According to the invention, the transparent layer is formed of a resin. Therefore, the transparent layer can be easily formed on the second substrate.

In the invention it is preferable that the second substrate further has a shading film on a portion of the surface thereof facing the first substrate which portion corresponds to the non-display portion of the first substrate.

According to the invention, the second substrate further has a shading film on a portion of the surface of the second substrate facing the first substrate which portion corresponds to the non-display portion of the first substrate. Orientation of the liquid crystal contained in the liquid crystal layer cannot be controlled in the non-display portion in which the driving devices and the wiring are disposed on the first substrate. Therefore, when the shading film does not exist on the portion of the surface of the second substrate facing the first substrate which portion corresponds to the non-display portion of the first substrate, the rays of light passing through the liquid crystal layer of the non-display portion pass through the second substrate and turn into a part of display light, thereby inviting the occurrence of display defect. Because the liquid crystal display apparatus according to the invention has the shading film on the portion of the surface of the second substrate facing the first substrate which portion corresponds to the non-display portion of the first substrate, however, the rays of light passing through the liquid crystal layer of the non-display portion do not pass through the second substrate, and the occurrence of display defect can be suppressed. When the shading film does not exist on the portion of the surface of the second substrate facing the first substrate which portion corresponds to the non-display portion of the first substrate, external rays of light are incident into the driving devices disposed on the non-display portion of the first substrate and current is generated. This current erroneously flows through the pixel electrodes and a voltage is applied to the liquid crystal layer, inviting the occurrence of display defect in some cases. Because the liquid crystal display apparatus according to the invention has the shading film on the portion of the surface of the second substrate facing the first substrate which portion corresponds to the non-display portion of the first substrate as described above, it is possible to prevent the external rays of light from being incident into the driving devices and to suppress the occurrence of display defect. Because the second substrate has the transparent layer on at least the portion of the surface of the second substrate facing the first substrate which portion corresponds to the display portion of the first substrate as described above, the thickness t1 of the liquid crystal layer of the non-display portion can be increased without changing the thickness t2 of the liquid crystal layer of the display portion even in the construction in which the non-display portion has the shading film. Therefore, display defect of the liquid crystal display apparatus can be reduced without lowering the liquid crystal injection speed during production.

In the invention it is preferable that the transparent layer is disposed in portions of the surface of the second substrate facing the first substrate which portions corresponds to the display portion and the non-display portion, respectively, and the thickness d1 of the transparent layer disposed on at least a part of the portion corresponding to the non-display portion is smaller than the thickness d2 of the transparent layer on the portion corresponding to the display portion (d1<d2).

According to the invention, the thickness d1 of at least a part of the transparent layer disposed in the portion corresponding to the non-display portion is smaller than the thickness d2 of the transparent layer disposed in the portion corresponding to the display portion (d1<d2). Inconsequence, the sectional area of at least a part of the liquid crystal layer of the display portion in a plane substantially perpendicular to the first and second substrates can be further increased. The transparent layer disposed in the portion corresponding to the non-display portion is recessed towards the second substrate and forms a recess, and this recess operates as a path when the liquid crystal is injected between the first substrate and the second substrate. Therefore, the liquid crystal injected flows through the recess and is quickly injected into the end portions of the first and second substrates bonded to each other. In consequence, the injection speed of the liquid crystal can be further increased and the injection time can be further shortened during production.

In the invention it is preferable that the transparent layer is not disposed in at least a part of the portion corresponding to the non-display portion.

According to the invention, the transparent layer is not disposed in at least a part of the portion corresponding to the non-display portion. Therefore, the sectional area of at least a part of the liquid crystal layer of the non-display portion in a plane substantially perpendicular to the first and second substrates can be further increased. A gap is defined between the adjacent transparent layers and operates as a flow path when the liquid crystal is injected between the first and second substrates. Therefore, the liquid crystal injected flows through the gap and is quickly injected to the end portions of the first and second substrates bonded to each other. It is thus possible to further increase the liquid crystal injection speed and to shorten the injection time during production.

In the invention it is preferable that the transparent layer is not disposed in at least a part of the portion corresponding to the non-display portion, and the difference $\Delta d$ ($\Delta d = d2 - s$) of the thickness $d2$ of the transparent layer of the portion corresponding to the display portion and the thickness $s$ of the shading film satisfies the following formula (1) when the thickness of the driving device is 0.2 to 0.4 μm, the thickness $t2$ of the liquid crystal layer of the display portion is 1.0 to 5.0 μm and the thickness $s$ of the shading film is 0.5 to 2.0 μm.

$$-1.5 \ \mu m < \Delta d \leq 2.4 \ \mu m \quad (1)$$

In the invention it is preferable that the difference $\Delta d$ ($\Delta d = d2 - s$) satisfies the following formula (2):

$$0 \ \mu m \phi \Delta d \leq 1.0 \ \mu m \quad (2)$$

According to the invention, because the difference $\Delta d$ ($\Delta d = d2 - s$) between the thickness $d2$ of the transparent layer of the portion corresponding to the display portion and the thickness $s$ of the shading film is selected within a suitable range, it is possible to further increase the liquid crystal injection speed and to further shorten the injection time during production.

In the invention it is preferable that a plurality of pixel electrodes are arranged in matrix with predetermined gaps thereamong to constitute a pixel electrode matrix, two adjacent rows of the pixel electrode matrix are arranged in such a fashion that the arrangement cycles defined by the plurality of pixel electrodes arranged in a row direction are mutually coincident, two adjacent columns of the pixel electrode matrix are arranged in such a fashion that the arrangement cycles defined by the plurality of pixel electrodes arranged in a column direction are mutually coincident, and the shading films are arranged at positions between the columns of the pixel electrode matrix in such a fashion as to extend in a direction parallel to the column direction of the pixel electrode matrix.

According to the invention, two adjacent rows of the pixel electrode matrix constituted by the plurality of pixel electrodes are arranges in such a fashion that the arrangement cycles are mutually coincident, and two adjacent columns of the pixel electrode matrix constituted by the plurality of pixel electrodes are arranged in such a fashion that the arrangement cycles are mutually coincident. Each shading film is arranged at a position between the columns of the pixel electrode matrix in such a fashion as to extend in the direction parallel to the column direction of the pixel electrode matrix. In other words, the shading films do not exist and extend in the direction perpendicular to the column direction of the pixel electrode matrix, and light transmissible portions have a stripe arrangement. Consequently, it is possible to acquire a liquid crystal display apparatus that is excellent in display performance of characters, etc, containing a large number of linear components parallel to the column direction of the pixel electrode matrix, has a high aperture ratio and is suitable for notebook type computers, television receivers, and so forth. The second substrate has the transparent layer on at least the portion of the surface of the second substrate facing the first substrate which portion corresponds to the display portion of the first substrate as described above. Therefore, it is possible to increase the injection speed of the liquid crystal, to shorten the injection time and to improve productivity in the production process of such a liquid crystal display apparatus.

In the invention it is preferable that a plurality of pixel electrodes are arranged in matrix with predetermined gaps thereamong to constitute a pixel electrode matrix, two adjacent rows of the pixel electrode matrix are arranged in such a fashion that the arrangement cycles defined by the plurality of pixel electrodes arranged in a row direction are mutually coincident, two adjacent columns of the pixel electrode matrix are arranged in such a fashion that the arrangement cycles defined by the plurality of pixel electrodes arranged in a column direction are mutually coincident, and shading films are arranged at positions between the rows of the pixel electrode matrix in such a fashion as to extend in a direction parallel to the row direction of the pixel electrode matrix, and are arranged at positions between the columns of the pixel electrode matrix in such a fashion as to extend in a direction parallel to the column direction of the pixel electrode matrix.

According to the invention, two adjacent rows of the pixel electrode matrix constituted by the plurality of pixel electrodes are arranged in such a fashion that the arrangement cycles are mutually coincident, and two adjacent columns of the pixel electrode matrix constituted by the plurality of pixel electrodes are arranged in such a fashion that the arrangement cycles are mutually coincident. The shading films are arranged at positions between the rows of the pixel electrode matrix in such a fashion as to extend in the direction parallel to the row direction of the pixel electrode matrix, and are arranged at positions between the columns of the pixel electrode matrix in such a fashion as to extend in a direction parallel to the column direction of the pixel electrode matrix. In other words, light transmissible portions have a mosaic arrangement. Consequently, it is possible to acquire a liquid crystal display apparatus that is excellent in display performance of oblique lines in both row and column directions of the pixel electrode matrix, and is suitable for measuring instruments and so forth. The second substrate has the transparent layer on at least the portion of the surface of the second substrate facing the first substrate which portion corresponds to the display portion of the first substrate as described above. Therefore, it is possible to increase the injection speed of the liquid crystal, to shorten the injection time and to improve productivity in the production process of such a liquid crystal display apparatus.

In the invention it is preferable that a plurality of pixel electrodes are arranged in matrix with predetermined gaps thereamong to constitute a pixel electrode matrix, two adjacent rows of the pixel electrode matrix are arranged in such a fashion that the arrangement cycles defined by the plurality of pixel electrodes arranged in a row direction mutually deviate by about a half cycle, two adjacent columns of the pixel electrode matrix are arranged in such a fashion that the arrangement cycles defined by the plurality of pixel electrodes arranged in a column direction are mutually coincident, and the shading films are arranged at positions between the rows of the pixel electrode matrix in such a fashion as to extend in a direction parallel to the row direction of the pixel electrode matrix, and are arranged at positions between the columns of the pixel electrode matrix in such a fashion as to extend along the column direction of the pixel electrode matrix.

According to the invention, two adjacent rows of the pixel electrode matrix are arranged in such a fashion that the arrangement cycles defined by the plurality of pixel electrodes arranged in a row direction mutually deviate by about a half cycle, and two adjacent columns of the pixel electrode matrix are arranged in such a fashion that the arrangement cycles are mutually coincident. The shading films are arranged at positions between the rows of the pixel electrode matrix in such a fashion as to extend in a direction parallel to the row direction of the pixel electrode matrix, and are arranged at positions between the columns of the pixel electrode matrix in such a fashion as to extend along the column direction of the pixel electrode matrix. In other words, light transmission portions have a delta ($\Delta$) arrangement. It is thus possible to acquire a liquid display device excellent in image display and suitable for television receivers and the like. The second substrate has the transparent layer on its surface facing on at least the portion of the surface of the second substrate facing the first substrate which portion corresponds to the display portion of the first substrate as described above. Therefore, it is possible to increase the injection speed of the liquid crystal, to shorten the injection time and to improve productivity in the production process of such a liquid crystal display apparatus.

In the invention it is preferable that the transparent layer has a mean transmission factor of at least 80% in a visible ray region.

According to the invention, the transparent layer has a mean transmission factor of at least 80% in the visible ray region. Therefore, it is possible to prevent light used for display from being absorbed by the transparent layer, the drop of light power and display from getting dark.

In the invention it is preferable that the thickness of the transparent layer is 2.0 µm or below.

According to the invention, the thickness of the transparent layer is 2.0 µm or below. The thickness of the transparent layer has variance of 5 to 10% when it is formed. When the thickness of the transparent layer is 2.0 µm or below as described above, however, variance of the thickness of the transparent layer can be kept at 0.2 µm or below. Because the thickness of the liquid crystal layer at which the transparent layer is formed can thus be reduced, the drop of display quality resulting from variance of the thickness of the liquid crystal layer can be prevented.

The invention further provides a method for producing a liquid crystal display apparatus comprising the steps of preparing a first substrate on one surface of which are formed a plurality of pixel electrodes for driving a liquid crystal, a plurality of driving devices so disposed as to correspond to the pixel electrodes, respectively, for controlling a potential of the pixel electrodes, and wiring electrically connected to the driving devices, on one surface of a first substrate; preparing a second substrate as another substrate, and forming a transparent layer on at least a portion of one surface of the second substrate corresponding to a predetermined portion to be a display portion of the first substrate; bonding the first substrate and the second substrate so as to oppose the one surface of the first substrate having the pixel electrodes formed thereon and the one surface of the second substrate having the transparent layer formed thereon with a predetermined gap therebetween; and forming a liquid crystal layer by injecting a liquid crystal between the first substrate and the second substrate.

According to the invention, the plurality of pixel electrodes, the plurality of driving devices and the wiring are formed on one surface of the first substrate, the transparent layer is formed on at least a portion of one surface of the second substrate corresponding to the predetermined portion to be a display portion of the first substrate, the first substrate and the second substrate are bonded to each other in such a fashion that the surface of the first substrate having the pixel electrodes formed thereon and the surface of the second substrate having the transparent layer formed thereon oppose each other with the predetermined gap therebetween, and the liquid crystal is injected between the first substrate and the second substrate to form a liquid crystal layer and to thus complete the liquid crystal display apparatus. Because the transparent layer is formed on at least the portion of the surface of the second substrate corresponding to the predetermined portion to be a display portion of the first substrate, the gap T1 defined by the surface layer of the first substrate and the surface layer of the second substrate in the non-display portion when the first and second substrates are bonded can be increased without changing the gap T2 defined by the surface layer of the first substrate and the surface layer of the second substrate in the display portion. Here, the term "the surface layer of the first substrate" means the layer closest to the second substrate among the layers of the first substrate facing the second substrate. The term represents the driving device or the wiring in the non-display portion and does the pixel electrode in the display portion.

The surface layer of the first substrate is not limited to the driving device, the wiring and the pixel electrode but may be a layer formed on the first substrate when an orientation film of a liquid crystal display apparatus is produced as shown in FIG. 1. The term "the surface layer of the second substrate" means the layer closest to the first substrate among the layers of the second substrate facing the first substrate. The term represents the second substrate itself in the non-display portion and the transparent layer in the display portion. The surface layer of the second substrate is not limited to the second substrate and the transparent layer but may be a layer formed on the second substrate when an orientation film of a liquid crystal display apparatus is produced as shown in FIG. 1.

When the transparent layer is not formed on the portion of the second substrate corresponding to the predetermined portion to be a display portion of the first substrate, the gap T1 of the non-display portion depends on the gap T2 of the display portion. Therefore, to increase the gap T1, the gap T2 must be increased. In other words, the gap T1 cannot be increased without changing the gap T2. When the gap T2 is increased so as to increase the gap T1, however, the amount of the liquid crystal injected between the first substrate and the second substrate increases and a longer time is necessary to inject the liquid crystal. When the gap T2 is excessively great, it becomes difficult to make the gap T2 uniform throughout the substrate as a whole and display defect occurs in the resulting liquid crystal display apparatus.

In the production method of the liquid crystal display apparatus according to the invention, the transparent layer is formed on at least a portion of the surface of the second substrate corresponding to the predetermined portion to be the display portion. Therefore, even when the gap between the first substrate and the second substrate is increased so as to increase the gap T1, the increment of the gap T2 can be made smaller than the increment of the gap between the first substrate and the second substrate by adjusting the thickness of the transparent layer. In other words, the gap T1 can be increased without changing the gap T2 and the gap T1 can be made greater than the gap T2. Therefore, it is possible to increase the sectional area of the portion to be the liquid crystal layer in the non-display portion on a plane substantially perpendicular to the first and second substrates, to secure the fluidization path of the liquid crystal in the non-display portion, too, where the driving devices and the wiring are disposed, when the liquid crystal is injected between the first substrate and the second substrate, and to lower the fluidization resistance. It is thus possible to increase the liquid crystal injection speed, to shorten the injection time and to improve productivity. A large-scale liquid crystal display apparatus can be produced, too.

In the invention it is preferable that the production method further includes a step of forming a shading film on a portion of one surface of the second substrate corresponding to a predetermined portion to be the non-display portion of the first substrate, before the transparent layer is formed on at least the portion of the one surface of the second substrate corresponding to the predetermined portion to be the display portion.

According to the invention, after the shading film is formed on at least a portion of one surface of the second substrate corresponding to the predetermined portion to be the non-display portion, the transparent layer is formed on at least a portion of the one surface of the second substrate corresponding to the predetermined portion to be the display portion. Therefore, when the shading film is formed on the portion of the one surface of the second substrate corresponding to the predetermined portion to be the non-display portion, too, the gap T1 between the surface layer of the first substrate and the surface layer of the second substrate can be increased in the non-display portion. It is thus possible to secure the fluidization path of the liquid crystal when the liquid crystal is injected between the first substrate and the second substrate, and to lower the fluidization resistance. In other words, a liquid crystal display apparatus which has the shading film in the non-display portion in which the driving devices and the wiring are disposed and which has reduced display defect can be produced without lowering the injection speed of the liquid crystal.

In the invention it is preferable that the step of forming the transparent layer on at least the portion of the one surface of the second substrate corresponding to the predetermined portion to be the display portion includes the steps of forming a photo-curable transparent resin layer by use of a transparent resin having a property of curing at a portion thereof irradiated with light on the one surface of the second substrate, irradiating light to the photo-curable transparent resin layer on at least the portion corresponding to the predetermined portion to be the display portion, and developing the photo-curable transparent resin layer.

According to the invention, the transparent layer is formed by the steps of forming the photo-curable transparent resin layer by use of a transparent resin having a property of curing at a portion thereof irradiated with light on the one surface of the second substrate, irradiating light to the portion of the one surface of the second substrate corresponding to the predetermined portion to be the display portion, and then conducting development. Consequently, the transparent layer to be disposed on at least the portion of the one surface of the second substrate can be easily formed in such a fashion so that the portion corresponds to the predetermined portion to be the display portion.

In the invention, it is preferable that the step of forming the transparent layer on the portion of the one surface of the second substrate corresponding to the predetermined portion to be the display portion includes the steps of forming a light decomposable transparent resin layer by use of a transparent resin having such a property of decomposition that a portion irradiated with light is decomposed, on the one surface of the second substrate, irradiating light to the light decomposable transparent resin layer in other portions than the portion corresponding to the predetermined portion to be the display portion, and developing the light decomposable transparent resin layer.

According to the invention, the transparent layer is formed by the steps of forming the light decomposable transparent resin layer from the transparent resin having such a property of decomposition that a portion irradiated with light is decomposed, on the one surface of the second substrate, irradiating light to portions other than the portion corresponding to the predetermined portion to be the display portion and then conducting development. Therefore, the transparent layer that is disposed on at least the portion of the one surface of the second substrate in such a fashion that the portion corresponds to the predetermined portion to be the display portion, can be easily formed.

In the invention, it is preferable that the step of forming the transparent layer on at least the portion of the one surface of the second substrate corresponding to the predetermined portion to be the display portion includes the steps of forming a transparent resin layer from a transparent resin on the one surface of the second substrate, forming a resist layer on the surface of the transparent resin layer, applying exposure to the resist layer so that solubility of the resist layer in at least the portion of the one surface of the second substrate corresponding to the predetermined portion to be the display portion to a developing agent is lower than those in portions other than the portion corresponding to the predetermined portion, developing the resist layer, and removing the transparent resin layer at the position at which the resist layer is removed.

According to the invention, the transparent layer is formed by the steps of forming the transparent resin layer from the transparent resin on the one surface of the second substrate, forming the resist layer on the surface of the transparent resin layer, applying exposure to the resist layer so that solubility of the resist layer in at least the portion of the one surface of the second substrate corresponding to the predetermined portion to be the display portion to the developing agent is lower than those in portions other than the portion corresponding to the predetermined portion, developing the resist layer, and removing the transparent resin layer at the position at which the resist layer is removed. Therefore, the transparent layer disposed on at least the portion of the one surface of the second substrate corresponding to the predetermined portion to be the display portion can be easily formed.

In the invention it is preferable that the step of forming the transparent layer on the portion of the one surface of the second substrate corresponding to the predetermined portion to be the display portion includes the steps of forming a resist layer on the one surface of the second substrate, applying exposure to the resist layer so that solubility of the resist layer in at least the portion corresponding to the predetermined portion to be the display portion to a developing agent is higher than those in portions other than the portion corresponding to the predetermined portion, developing the resist layer, forming a transparent resin layer from a transparent resin in such a fashion as to cover the surface of the second substrate from which the resist layer is removed and the surface of the resist layer, and removing the resist layer and the transparent resin layer formed on the surface of the resist layer by use of a peeling solution.

According to the invention, the transparent layer is formed by the steps of forming the resist layer on the one surface of the second substrate, applying exposure to the resist layer so that solubility of the resist layer in at least the portion corresponding to the predetermined portion to be the display portion to the developing agent is higher than those in portions other than portion corresponding to the predetermined portion, developing the resist layer, forming the transparent resin layer from the transparent resin in such a fashion as to cover the surface of the second substrate from which the resist layer is removed and the surface of the resist layer, and removing the resist layer and the transparent resin layer formed on the surface of the resist layer by use of the peeling solution. In other words, the transparent layer is formed in accordance with a liftoff method. Therefore, the transparent layer disposed on at least the portion of the one surface of the second substrate corresponding to the predetermined portion to be the display portion can be easily formed.

BRIEF DESCRIPTION OF THE DRAWINGS

Other and further objects, features, and advantages of the invention will be more explicit from the following detailed description taken with reference to the drawings wherein:

FIG. 4 is a front view showing the liquid crystal display apparatus as a whole.

FIGS. 6A and 6B explain an operation of a shading film to rays of light transmitting through an orientation defect area.

FIGS. 7A and 7B explain an operation of the shading film to external rays of light.

FIGS. 8A to 8C show a positional relationship between the shading film and a pixel electrode and between the shading film and a transparent layer.

FIGS. 30A to 30C show a state where a transparent layer is formed in comparison with a state where the transparent layer is not formed.

FIG. 39 shows a relation between a thickness d2 (μm) of a transparent layer of a display portion and a liquid crystal charging time (minute) for each gap w (μm).

DESCRIPTION OF THE PREFERRED EMBODIMENTS

Figure 1:
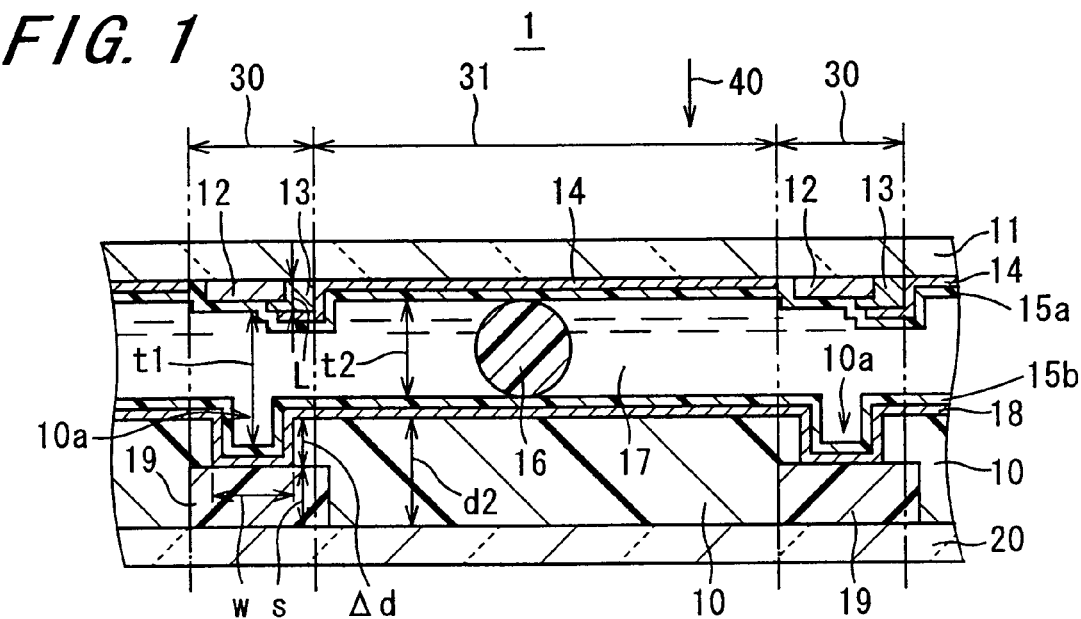
FIG. 1 is a schematic sectional view showing a part of a construction of a liquid crystal display apparatus according to a first embodiment of the invention in a simplified form.

Now referring to the drawings, preferred embodiments of the invention are described below.

Figure 2:
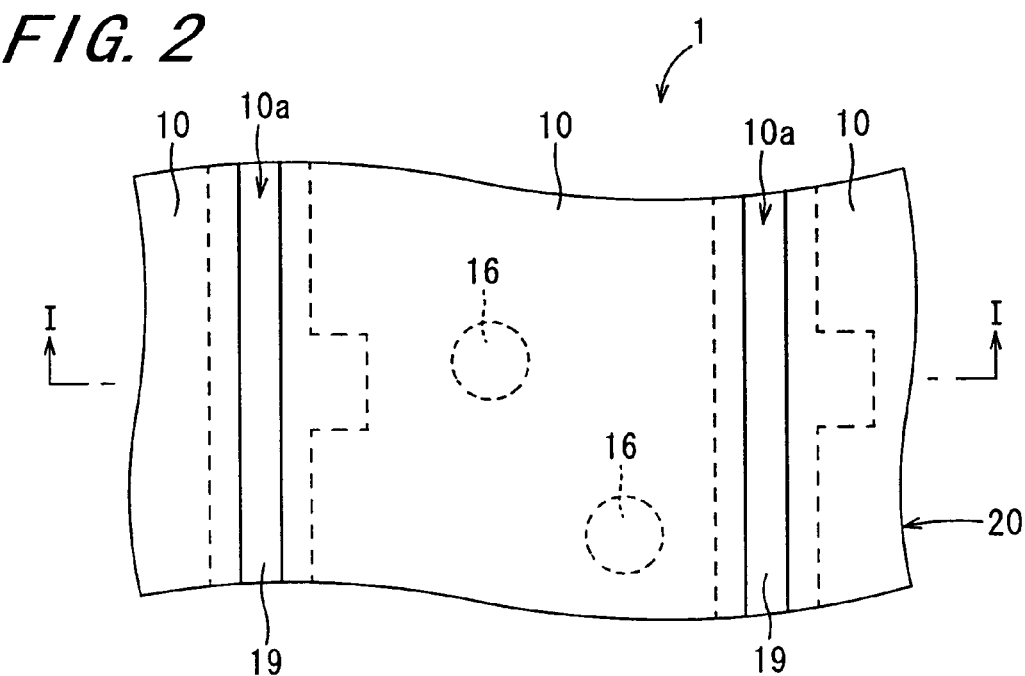
FIG. 2 is a plan view when the liquid crystal display apparatus shown in FIG. 1 is viewed from a direction of an arrow 40.
Figure 3:
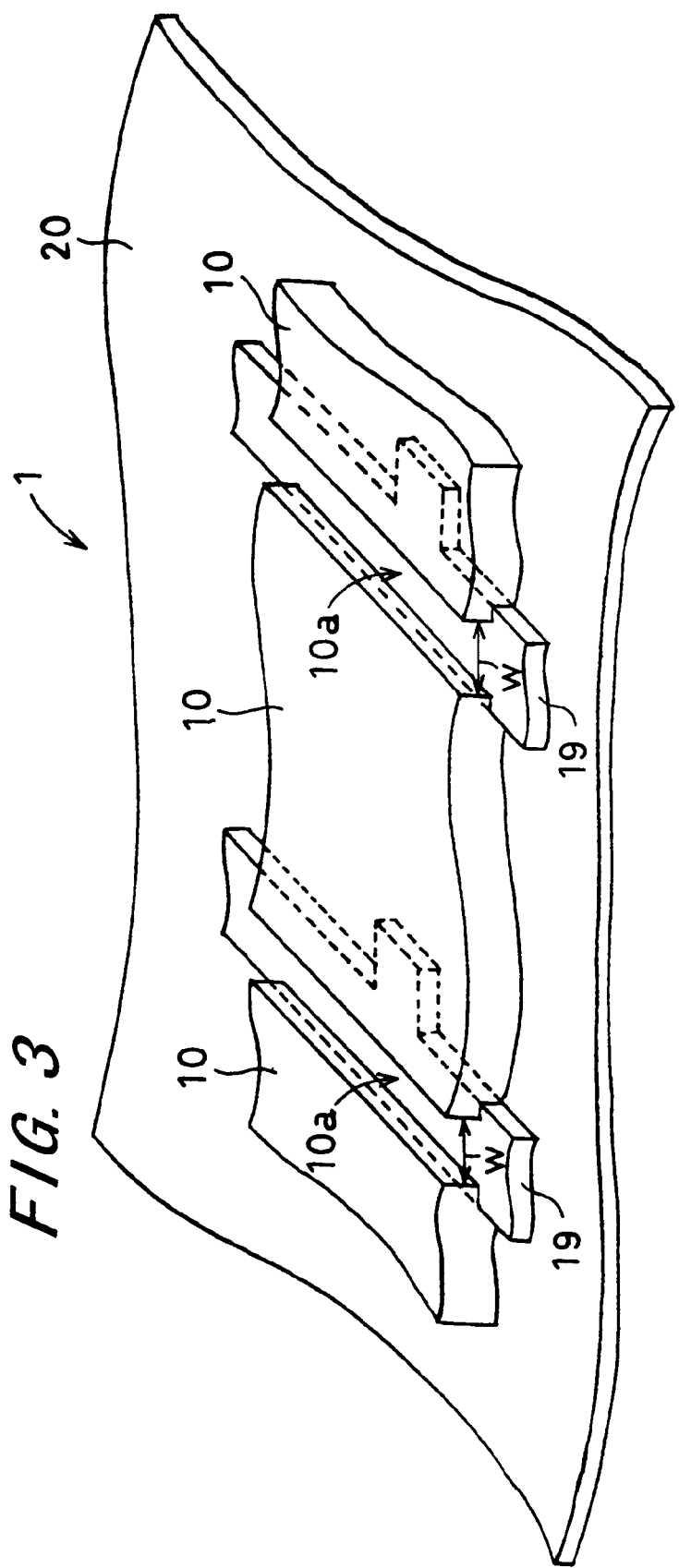
FIG. 3 is a perspective view when the liquid crystal display apparatus shown in FIG. 1 is viewed from an obliquely upward direction.

FIG. 1 is a schematic sectional view showing a construction of a part of a liquid crystal display apparatus 1 according to a first embodiment of the invention in a simplified form. FIG. 2 is a plan view of the liquid crystal display apparatus 1 shown in FIG. 1 when viewed from a direction indicated by an arrow 40. FIG. 1 corresponds to a sectional view taken along a line I—I in FIG. 2. FIG. 3 is a perspective view when the liquid crystal display apparatus 1 shown in FIG. 1 is viewed from an obliquely upward direction. FIG. 4 is a front view of the liquid crystal display apparatus 1 as a whole. Incidentally, an opposing substrate 11, a signal wiring 12, a thin film transistor (TFT) device 13, a pixel electrode 14, orientation films 15a and 15b, a liquid crystal layer 17 and a thin film electrode 18 that are shown in FIG. 1 are omitted from FIG. 2 because illustration becomes so complicated as to hinder understanding. Similarly, the opposing substrate 11, the signal wiring 12, the TFT device 13, the pixel electrode 14, the orientation films 15a and 15b, a spacer 16, the liquid crystal layer 17 and the thin film electrode 18 that are shown in FIG. 1 are omitted from FIG. 3 because illustration becomes so complicated as to hinder understanding.

The liquid crystal display apparatus 1 includes the opposing substrate 11 as a first substrate, a transparent substrate 20 as a second substrate and the liquid crystal layer 17. A plurality of pixel electrodes 14 for driving a liquid crystal contained in the liquid crystal layer 17, a plurality of TFT devices 13 as driving devices arranged for the pixel electrodes 14, respectively, for controlling the potentials of the pixel electrodes 14, signal wiring 12 electrically connected to the TFT devices 13, scanning wiring (not shown) electrically connected to the TFT devices 13, and the orientation film 15a for controlling orientation of the liquid crystal contained in the liquid crystal layer 17 are formed on the surface of the opposing substrate 11 that opposes the transparent substrate 20. A transparent layer 10, a shading film 19, a thin film electrode 18 and the orientation film 15b are formed on the surface of the transparent substrate 20 that opposes the opposing substrate 11. The spacer 16 formed of glass or plastic is interposed between the opposing substrate 11 and the transparent substrate 20 to keep a gap between them at a predetermined value. The liquid crystal 17 is formed as the liquid crystal is injected between the opposing substrate 11 and the transparent substrate 20 from an injection port 27 of a liquid crystal cell 28 formed by bonding the opposing substrate 11 and the transparent substrate 20 to each other through a sealant. A display screen 29 of the liquid crystal display apparatus 1 is a portion at which the TFT devices 13 and the signal wiring 12 are arranged. The display screen 29 includes a non-display portion 30 that is not used for display and a display portion 31 other than the non-display portion 30 and used for display.

A plurality of signal wirings 12 are arranged on the opposing substrate 11 so as to extend in a predetermined one direction and in parallel with one another with predetermined therebetween in another direction perpendicular to the one direction. A plurality of scanning wirings are arranged on the opposing substrate 11 so as to extend in the another direction and in parallel with one another with predetermined gaps therebetween in the one direction. The pixel electrodes 14 are arranged on the opposing substrate 11 encompassed by the signal wirings 12 and scanning wirings in such a fashion as to form the display portion 31. A TFT device 13 is arranged in the proximity of the point of intersection between the signal wiring 12 and the scanning wiring. The gate electrode of the TFT device 13 is electrically connected to the scanning wiring, and is electrically connected to the corresponding pixel electrode 14 and to the corresponding signal wiring 12. The orientation film 15a is formed in such a fashion as to cover the signal wirings 12, the TFT devices 13 and the pixel electrodes 14.

The shading film 19 is arranged at a position facing each signal wiring 12 on the transparent substrate 20 in parallel with each signal wiring 12 in such a fashion as to extend in one direction described above. The transparent layer 10 is interruptedly disposed on the surface of the transparent substrate 20 that opposes the opposing substrate 11. In other words, the transparent layer 10 is disposed in such a fashion as to cover the surface of the transparent substrate 20 extending between the adjacent shading films 19 and a part of the surface of the shading film 19 in the transverse direction perpendicular to one direction described above that opposes the opposing substrate 11. Consequently, as to one shading film 19, the transparent layers 10 are arranged in such a fashion as to keep gaps w on both sides of the shading film 19 in the transverse direction, to expose the surface of the shading film 19 facing the opposing substrate 11 and to define a gap 10a. In other words, the transparent layer 10 is not disposed in at least a part of the non-display portion 30, or the transparent layer 10 is cut off by at least a part of the non-display portion 30. The thin film electrode 18 is arranged in such a fashion as to cover the transparent layer 10 and the shading film 19 the surface of which is exposed. The orientation film 15b is arranged in such a fashion as to cover the thin film electrode 18. The spacer 16 keeps contact with the orientation film 15a of the opposing substrate 11 and the orientation film 15b of the transparent substrate 20.

The transparent layer 10 is arranged on at least a portion of the surface of the transparent substrate 20 opposing the opposing substrate 11, the portion of the surface corresponding to the display portion 31. According to this arrangement, the thickness t1 of the liquid crystal layer 17 of at least a part of the non-display portion 30 can be increased without changing the thickness t2 of the liquid crystal layer 17 of the display portion 31. The thickness t1 can be made greater than the thickness t2, too. It is therefore possible to increase the sectional area of the liquid crystal layer 17 of the non-display portion 30 substantially perpendicular to the opposing substrate 11 and to the transparent substrate 20, to secure the fluidization path of the liquid crystal in the non-display portion 30 provided with the TFT devices 13 and the signal wirings 12 when the liquid crystal is injected between the opposing substrate 11 and the transparent substrate 20 and to lower fluidization resistance. In other words, it is possible to obtain a liquid crystal display apparatus having a high injection speed of the liquid crystal during production, a short injection time and high productivity. A large-scale liquid crystal display apparatus can be accomplished, too. This effect is remarkable in the black-and-white liquid crystal display apparatus not having a color filter, particularly in a black-and-white liquid crystal display apparatus provided with the shading film 19.

Figure 5A:
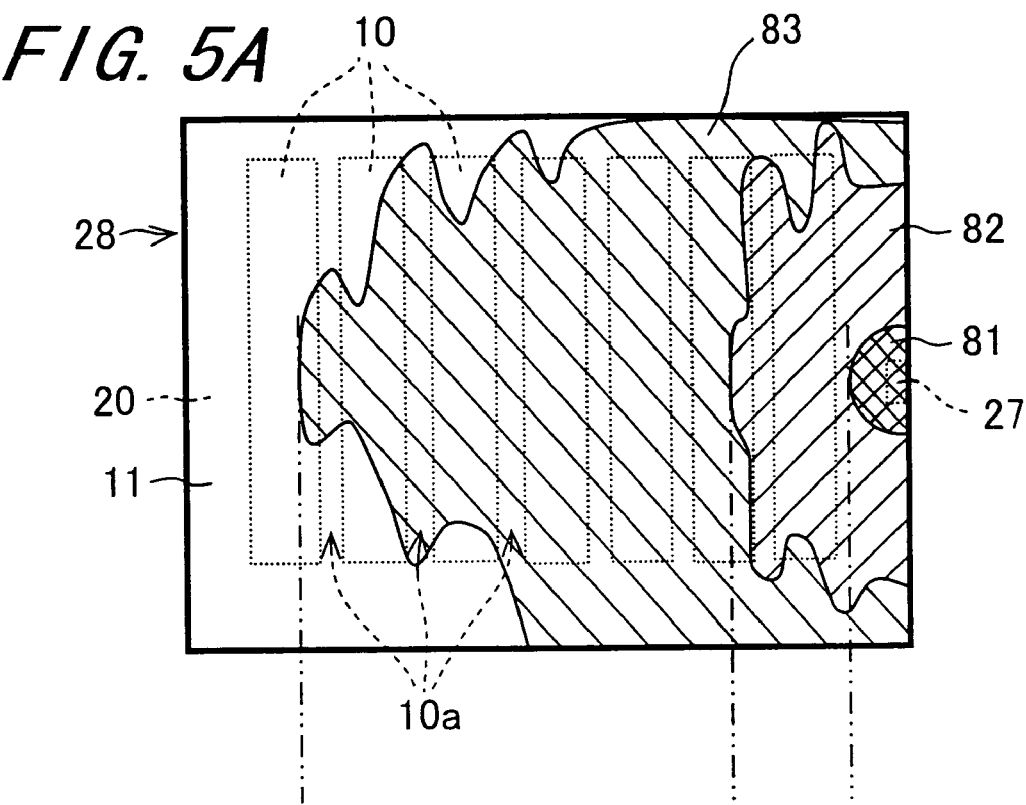
FIGS. 5A and 5B explain the relation between an area to which a liquid crystal is injected and a time lapsed from the start of injection.
Figure 5B:
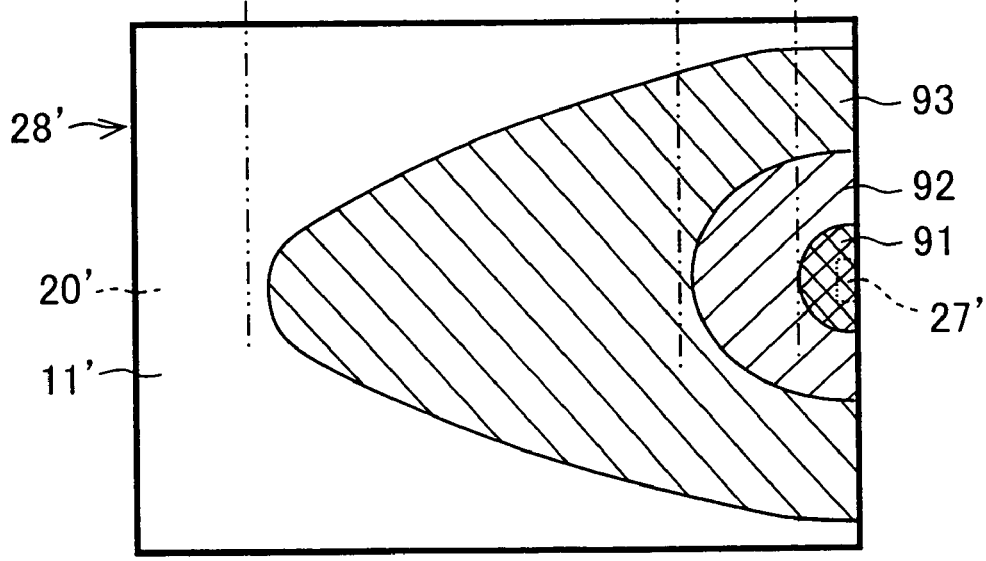

FIGS. 5A and 5B are explanatory views useful for explaining the relationship between an area to which the liquid crystal is injected and a time lapsed from the start of injection. FIG. 5A is a plan view schematically showing a construction in which the transparent layer 10 according to this embodiment is provided. FIG. 5B is a plan view schematically showing a construction in which the transparent layer 10 is not provided. Incidentally, FIGS. 5A and 5B show the construction in a simplified form and illustrate the transparent layer 10, the transparent substrates 20 and 20', the opposing substrates 11 and 11' and the injection ports 27 and 27'. Further, FIGS. 5A and 5B show one each injection port 27 shown in FIG. 4 and injection port 27' formed in the same way as the injection port 27 for the sake of explanation.

The liquid crystal injected respectively from the injection ports 27 and 27' is injected into areas 81 and 91 indicated by crossing oblique lines after the passage of time tm1 from the start of injection. As the time further lapses, the liquid crystal is injected into areas 82 and 92 indicated by left downward oblique lines and broader than the areas 81 and 91 after the passage of time tm2 longer than the time tm1 (tm2>tm1). At this time, the area of the area 82 provided with the transparent layer 10 is greater than the area of the area 92 not provided with the transparent layer 10. As the time further lapses, the liquid crystal is injected into areas 83 and 93 indicated by right downward oblique lines and broader than the areas 82 and 92 after the passage of time tm3 longer than the time tm2 described above (tm3>tm2>tm1). The difference of the area between the area 83 when the transparent layer 10 is provided and the area of the area 93 when the transparent layer 10 is not provided after the passage of the time tm3 becomes further greater than the difference of the area between the area 82 when the transparent layer 10 is provided and the area of the area 92 when the transparent layer 10 is not provided after the passage of the time tm2.

More specifically, injection of the liquid crystal is accomplished by the steps of reducing the pressure inside the liquid crystal cell formed by bonding the opposing substrate 11, 11' and the transparent substrate 20, 20' through the spacer, immersing an end part of the liquid crystal cell having the injection port 27, 27' formed therein into a liquid crystal reservoir, and, while maintaining the state of immersion, elevating the pressure of the liquid crystal cell and the pressure around the liquid pressure reservoir to the atmospheric pressure, as will be later described.

The liquid crystal injected from the injection ports 27 and 27' is injected into the areas 81 and 91 after the passage of the time tm1 from the start of injection. The injection area of the liquid crystal at this time is substantially equal between the case where the transparent layer is provided (see FIG. 5A) and the case where the transparent layer is not provided (see FIG. 5B).

As the time further lapses, the liquid crystal is injected to areas 82 and 92 broader than the areas 81 and 91 after the passage of time tm2 longer than the time tm1 (tm2>tm1). The injection area of the liquid crystal at this time is greater in the liquid crystal cell 28 having the transparent layer than the liquid crystal cell 28' not having the transparent layer. In the liquid crystal cell having the transparent layer, in particular, the liquid crystal is quickly guided in the transverse direction of the liquid crystal cell that is the extending direction of the transparent layer. In the liquid crystal cell not having the transparent layer, on the other hand, the injection speed of the liquid crystal in the longitudinal direction of the liquid crystal cell is a little lower than in the liquid crystal cell having the transparent layer, and the injection speed in the transverse direction is remarkably lower than in the liquid crystal cell having the transparent layer.

As the time further lapses, the liquid crystal is injected to areas 83 and 93 broader than the areas 82 and 92 after the passage of time tm3 longer than the time tm2 (tm3>tm2>tm1). In the liquid crystal cell having the transparent layer, the liquid crystal is guided to the full length in the transverse direction of the liquid crystal cell in about the half area of the whole area of the liquid crystal cell. In the liquid crystal cell not having the transparent layer, on the other hand, there is no area into which the liquid crystal is guided to the full length in the transverse direction, and the area of the injected area is smaller than in the case of the liquid crystal cell having the transparent layer.

In the case of the liquid crystal cell having the transparent layer, the sectional area of the flow path formed in the non-display portion 30 becomes great due to the existence of the transparent layer 10 and the liquid crystal is more likely to flow in the extending direction of the transparent layer 10 than in the liquid crystal cell which does not have the transparent layer and has a smaller sectional area of the flow path. In consequence, the liquid crystal can be guided more quickly in the transverse direction of the liquid crystal cell. In the case of the liquid crystal cell not having the transparent layer, on the other hand, the sectional area of the flow path formed in the non-display portion is small. Therefore, the liquid crystal cannot easily move in the transverse direction of the liquid crystal cell and cannot be easily guided in the transverse direction of the liquid crystal cell.

As described above, in this embodiment, the transparent layer 10 is disposed on at least the portion of the surface of the transparent substrate 20 corresponding to the display portion 31 and faces the opposing substrate 11. It is therefore possible to increase the sectional area on the surface of the liquid crystal layer 17 of the surface of the non-display portion 30 substantially perpendicular to the opposing substrate 11 and to the transparent substrate 20, to secure the fluidization path of the liquid crystal in the non-display portion 30 at the time of injection of the liquid crystal between the opposing substrate 11 and the transparent substrate 20 and to lower the fluidization resistance. Therefore, the liquid crystal injected from the injection port 27 in the construction in which the transparent layer 10 is disposed as shown in FIG. 5A can fill a greater area within the same predetermined time than the liquid crystal injected from the injection port 27' in the construction in which the transparent layer 10 is not disposed as shown in FIG. 5B. Therefore, this embodiment can improve the injection speed of the liquid crystal and can shorten the injection time.

As shown in FIGS. 1 to 3, the transparent layer 10 is not disposed in at least a part of the non-display portion 30. Therefore, the sectional area of the surface of at least a part of the liquid crystal layer 17 of the non-display portion 30 substantially perpendicular to the opposing substrate 11 and to the transparent substrate 20 can be further increased in comparison with the case where the transparent layer 10 is disposed in the whole non-display portion 30. A gap 10a having a gap w is defined between the adjacent transparent layers 10 and operates as the flow path when the liquid crystal is injected between the opposing substrate 11 and the transparent substrate 20. In consequence, the liquid crystal injected from the injection port 27 flows through the gap 10a and is quickly injected to even the end portion of the liquid crystal cell 28 formed by bonding the opposing substrate 11 and the transparent substrate 20 to each other. In other words, it can be understood that according to the construction of the invention in which the transparent layer 10 is disposed, as shown in FIG. 5A, the areas 82 and 83 into which the liquid crystal is injected are expanded to broader areas along the longitudinal direction of the gaps 10a defined between the adjacent transparent layers 10. Therefore, in comparison with the case where the transparent layer 10 is disposed in the whole non-display portion 30, this embodiment can further improve the injection speed of the liquid crystal during production and can further shorten the injection time.

In the construction in which the transparent layer 10 is not disposed in a part of the non-display portion 30, the difference $\Delta d$ ($\Delta d = d2 - s$) of the thickness $d2$ of the transparent layer 10 of the display portion 31 and the thickness $s$ of the shading film 19 preferably satisfies the following equation (1) and more preferably the following equation (2) when the thickness $L$ of the TFT device 13 as the driving device is from 0.2 to 0.4 μm, the thickness t2 of the liquid crystal layer 17 of the display portion 31 is from 1.0 to 5.0 μm and the thickness s of the shading film 19 is from 0.5 to 2.0 μm:

$$-1.5 \text{ μm} < \Delta d \leq 2.4 \text{ μm} \quad (1)$$

$$0 \text{ μm} \leq \Delta d \leq 1.0 \text{ μm} \quad (2)$$

It is therefore possible to further improve the injection speed of the liquid crystal during production and to further shorten the injection time. When the Δd value is smaller than −1.5 μm, it becomes difficult to inject the liquid crystal between the opposing substrate 11 and the transparent substrate 20 during production. When the Δd value is greater than 2.4 μm, the effect of shortening the injection time drops. Further, pattern accuracy of the transparent layer 10 formed by photolithography, that is, resolution, drops due to the increase of the film thickness, and the gap 10a having the gap w shown in FIG. 1 cannot be formed easily between the adjacent transparent layers 10. Therefore, the Δd value is so set as to satisfy the relation −1.5 μm<Δdϕ2.4 μm.

The mean transmission factor of the transparent layer 10 in the visible ray region is 80% or more. Therefore, it is possible to prevent the decrease of light power of light used for display due to absorption by the transparent layer 10 and to prevent display from getting dark.

The shading film 19 is arranged on the surface of the transparent substrate 20 corresponding to the non-display portion 30 and facing the opposing substrate 11. Consequently, the occurrence of display defect can be suppressed.

FIGS. 6A and 6B are explanatory views for explaining the operation of the shading film 19 to the rays of light 100 transmitting through the orientation defect area 170. FIGS. 7A and 7B are explanatory views for explaining the operation of the shading film 19 to the rays of light 200 from outside. In FIGS. 6A and 6B and FIGS. 7A and 7B, the construction having the shading film 19 will be explained in contrast with the construction not having the shading film 19. FIGS. 6A and 7A schematically showing the construction having the shading film 19 according to embodiment of the invention and FIGS. 6B and 7B schematically show the construction not having the shading film 19.

As shown in FIGS. 6A and 6B, an orientation defect area 170 indicated by a dotted line exists because orientation of the liquid crystal contained in the liquid crystal layer 17 cannot be controlled in the non-display portion 30 in which the TFT device 13 and the signal wirings 12 are disposed on the opposing substrate 11. When the shading film 19 does not exist on the portion of the surface of the transparent substrate 20 facing the opposing substrate 11 which portion corresponds to the non-display portion 30 of the opposing substrate 11 as shown in FIG. 6B, the rays of light 100 passing through the liquid crystal layer 17 of the non-display portion 30, that is, the orientation defect area 170, become a part of display light by passing through the transparent substrate 20, and the orientation defect is likely to occur. When the shading film 19 exists on the portion of the surface of the transparent substrate 20 facing the opposing substrate 11 which portion corresponds to the non-display portion 30 of the opposing substrate 11 as shown in FIG. 6A, on the other hand, the rays of light 100 passing through the liquid crystal layer 17 of the non-display portion 30, that is, the orientation defect area 170, are absorbed by the shading film 19 and cannot pass through the transparent substrate 20. Consequently, the occurrence of the display defect can be suppressed.

When the shading film 19 does not exist on the portion of the surface of the transparent substrate 20 facing the opposing substrate 11 which portion corresponds to the non-display portion 30 of the opposing substrate 11 as shown in FIG. 7B, the rays of light 200 from outside are incident into the TFT device 13 disposed on the opposing substrate 11 of the non-display portion 30 and thereby generate a current. The current erroneously flows through the pixel electrode 14 and a voltage is applied to the liquid crystal layer 17. Therefore, display defect is likely to occur. When the shading film 19 exists on the portion of the surface of the transparent substrate 20 facing the opposing substrate which portion corresponds to the non-display portion 30 of the opposing substrate 11 as shown in FIG. 7A, on the other hand, the rays of light 200 are absorbed by the shading film 19. In this way, it is possible to prevent the external rays of light 200 from being incident into the TFT device 13 and to prevent the occurrence of the display defect.

As described above, the occurrence of the display defect can be suppressed by disposing the shading film 19. As described above, too, because the transparent substrate 20 has the transparent layer 10 at least on the portion of its surface facing the opposing substrate 11 which portion corresponds to the display portion 31 of the opposing substrate, the thickness t1 of the liquid crystal layer 17 of the non-display portion 30 can be increased without changing the thickness t2 of the liquid crystal layer 17 of the display portion 31 even in the construction in which the non-display portion 30 has the shading film 19. Therefore, the display defect of the liquid crystal display apparatus can be reduced without lowering the injection speed of the liquid crystal during production.

FIGS. 8A to 8C show the positional relationship between the shading film 19 and the pixel electrode 14 and the positional relationship between the shading film 19 and the transparent layer 10. FIG. 8A is a plan view schematically showing the positional relationship between the shading film 19 and the pixel electrode 14 when viewed from the direction indicated by an arrow 40 in FIG. 1. FIG. 8B is a plan view schematically showing the positional relationship between the shading film 19 and the transparent layer 10 when viewed from the direction indicated by an arrow 40 in FIG. 1. FIG. 8C is a sectional view taken along a line II—II of FIG. 8B. Incidentally, FIG. 8A shows only the shading film 19, the pixel electrode 14 and the transparent substrate 20, and FIGS. 8B and 8C show only the shading film 19, the transparent layer 10 and the transparent substrate 20.

As shown in FIG. 8A, a plurality of pixel electrodes 14 is arranged in matrix with predetermined gaps among them to constitute a pixel electrode matrix 140. Two rows of the pixel electrode matrix 140 adjacent to each other are arranged in such a fashion that their pitch is in conformity with the arrangement cycle formed by a plurality of pixel electrodes 14 arranged in the row direction indicated by reference numeral 42, that is, a pitch B. Two columns of the pixel electrode matrix 140 adjacent to each other are arranged in such a fashion that their pitch is in conformity with the arrangement cycle formed by a plurality of pixel electrodes 14 arranged in the column direction indicated by reference numeral 43, that is, a pitch A. The shading film 19 is arranged at the corresponding position between the columns of the pixel electrode matrix 140 in such a manner as to extend in a direction parallel to the column direction 43 of the pixel electrode matrix 140. In other words, the shading film 19 does not exist and extend in the row direction 42 perpendicular to the column direction 43 of the pixel electrode matrix 140, and portions through which the rays of light can pass through and which are indicated by oblique lines (hereinafter called "light transmission portions") 300 have a stripe arrangement. Consequently, it is possible to acquire a liquid crystal display apparatus suitable for a notebook type personal computer and a television receiver and so forth in which display of those characters that contain a large number of linear components parallel to the column direction 43 of the pixel electrode matrix 140 is excellent and an aperture ratio is high.

As described above, the transparent layer 10 is arranged at least on the portion of the surface 20a of the transparent substrate 20 facing the opposing substrate 11 which portion corresponds to the display portion 31 of the opposing substrate 11. This transparent layer 10 is disposed at the position corresponding to each column of the pixel electrode matrix 140 at which the shading film 19 is not disposed, in such a fashion as to extend in parallel with the column direction 43 of the pixel electrode matrix 140 as shown in FIG. 8B. Therefore, as shown in FIGS. 8A to 8C, it is possible to increase the injection speed of the liquid crystal, to shorten the injection time and to improve productivity in the production process of the liquid crystal display apparatus having the shading film 19.

In the liquid crystal display apparatus 1 having the construction described above the thickness t1 of the liquid crystal layer 17 of at least a part of the non-display portion 30 described above is preferably 0.48 times or more of the thickness t2 of the liquid crystal layer 17 of the display portion 31 (t1γ0.48t2).

Figure 9A:
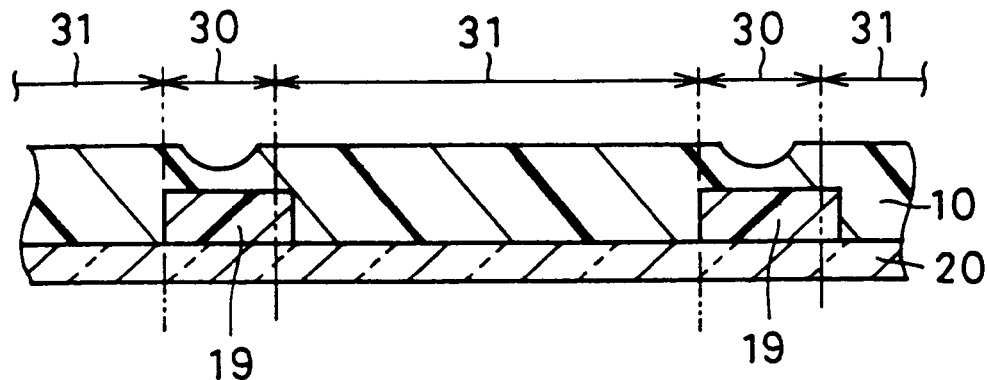
FIGS. 9A to 9C schematically show a shape of a transparent layer arranged in a non-display portion.
Figure 9B:
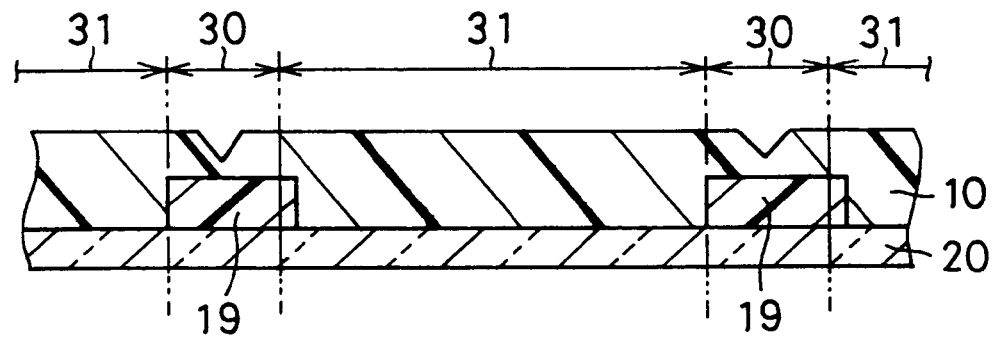
Figure 9C:
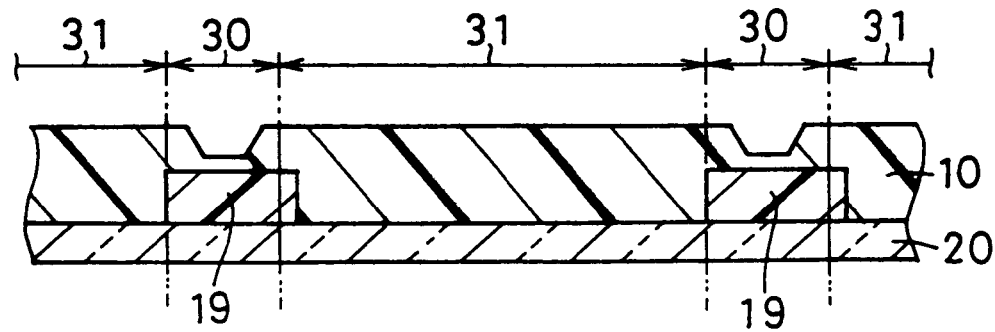
Figure 10:
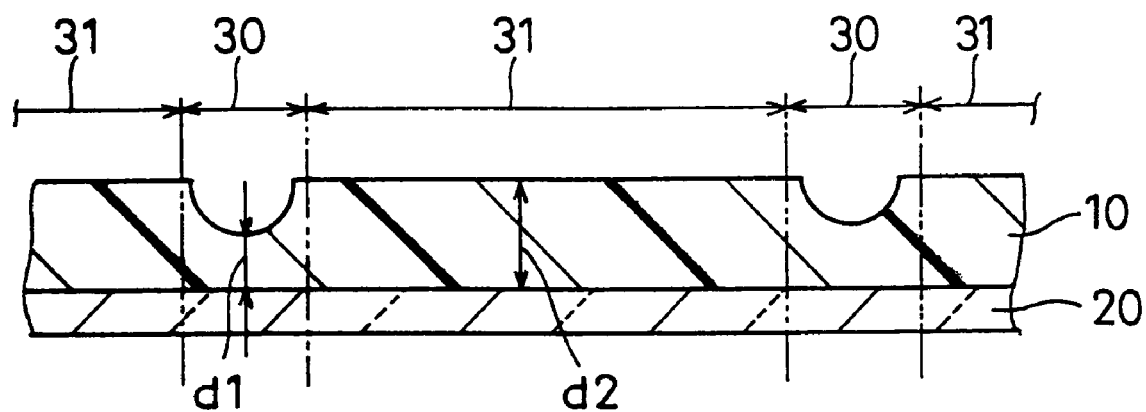
FIG. 10 schematically shows a shape of a transparent layer arranged in a non-display portion in a construction not having the shading film.

FIGS. 9A to 9C schematically shows the shape of the transparent layer 10 arranged in the non-display portion 30. FIG. 10 schematically shows the shape of the transparent layer 10 disposed in the non-display portion 30 in the construction not having the shading film 19. Incidentally, FIGS. 9A to 9C show only the transparent layer 10, the shading film 19 and the transparent substrate 20 and FIG. 10 shows only the transparent layer 10 and the transparent substrate 20. As described above, the transparent layer 10 is not disposed in at least a part of the non-display portion 30 in this embodiment but the invention is not limited thereto. The transparent layer 10 may well be disposed in the whole non-display portion 30. In this case, the transparent layer 10 disposed in the non-display portion 30 preferably has a shape recessed on the side of the transparent substrate 20 as shown in FIGS. 9A to 9C.

More specifically, a groove that opens to the surface facing the opposing substrate 11 and extends in one direction is formed in the transparent layer 10 disposed in the portion corresponding to the non-display portion 30. In the embodiment shown in FIG. 9A, the groove is defined by a curve surface represented as an arc having a predetermined radius of curvature in the plane perpendicular to one direction described above. In the embodiment shown in FIG. 9B, the groove comprises two slope surfaces interconnected to each other at one of the ends thereof. It is a V-shaped groove defined by two slope surfaces expanding in the mutually departing directions toward the surface from a position inward than the surface. In the embodiment shown in FIG. 9C, the groove is a trapezoidal groove that is disposed inward than the surface and is defined by a bottom surface parallel to the surface and having a width smaller than that of the opening, and two slope surfaces extending from both ends of the bottom surface in the width direction and expanding in mutually departing directions toward the surface.

When the transparent layer 10 is disposed in the whole non-display portion 30 in the construction in which the shading film 19 is not disposed though it is different from the embodiment of the invention, the thickness d1 of at least a part of the transparent layer 10 disposed in the non-display portion 30 is preferably smaller than the thickness d2 of the transparent layer 10 disposed in the display portion 31 (d1<d2).

More specifically, in the embodiment shown in FIG. 10, the groove is the one that is defined by a curve surface having a predetermined radius of curvature. In this case, the thickness d1 of the transparent layer 10 disposed in the non-display portion 30 that is the distance between the deepest position of the groove and the position of the surface on the side of the transparent substrate 20 closest to the deepest position of the groove is preferably smaller than the thickness d2 of the transparent layer 10 disposed in the display portion 31 (d1<d2).

Consequently, it is possible to further increase the sectional area of the surface on at least a part of the liquid crystal layer 17 of the non-display portion 30 substantially perpendicular to the opposing substrate 11 and to the transparent substrate 20 in the same way as when the transparent layer 10 is not disposed on at least a part of the non-display portion 30. The transparent layer 10 disposed in the non-display portion 30 has the recess shape recessed towards the transparent substrate 20, provides the recess and operates as the flow path when the liquid crystal is injected between the opposing substrate 11 and the transparent substrate 20. Therefore, the liquid crystal injected flows through the recess and is quickly injected even to the end part of the liquid crystal cell 28 formed by bonding the opposing substrate 11 and the transparent substrate 20. It is thus possible to further increase the injection speed of the liquid crystal and to shorten the injection time during production.

This embodiment uses the thin film transistor (TFT) device 13 as the driving device but is not limited thereto. Namely, the embodiment can use other three-terminal devices or two-terminal devices such as a thin film diode device.

Next, the production method of the liquid crystal display apparatus 1 shown in FIG. 1 will be explained. FIGS. 11 to 26 and FIGS. 28 and 29 are sectional views each schematically showing the state of each step in the production of the liquid crystal display apparatus 1. Incidentally, FIGS. 11 to 19 show in magnification a predetermined portion in which the TFT device 13 is formed.

Figure 11:
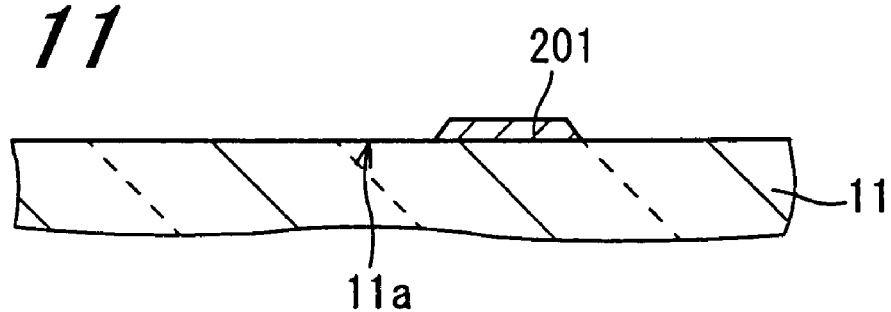
FIG. 11 shows a state where a gate electrode is formed on one surface of an opposing substrate.

FIG. 11 depicts the state where a gate electrode 201 is formed on one surface 11a of the opposing substrate 11. An aluminum (Al) film, or the like, is formed by sputtering, for example, on the one surface 11a of the opposing substrate 11 such as a glass substrate formed of alkali-free glass, and is then patterned by photolithography, for example, into the gate electrodes 201.

Figure 12:
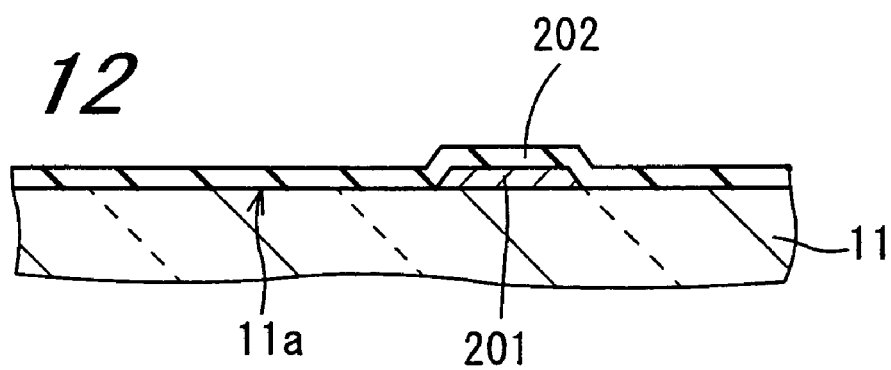
FIG. 12 shows a state where a gate insulating film is formed.

FIG. 12 shows the state where a gate insulating film 202 is formed. A silicon nitride (SiNx) film is formed on the surface of the gate electrode 201 and on the one surface 11a of the opposing substrate 11 by chemical vapor deposition (abbreviated as "CVD") or sputtering to form the gate insulating film 202.

Figure 13:
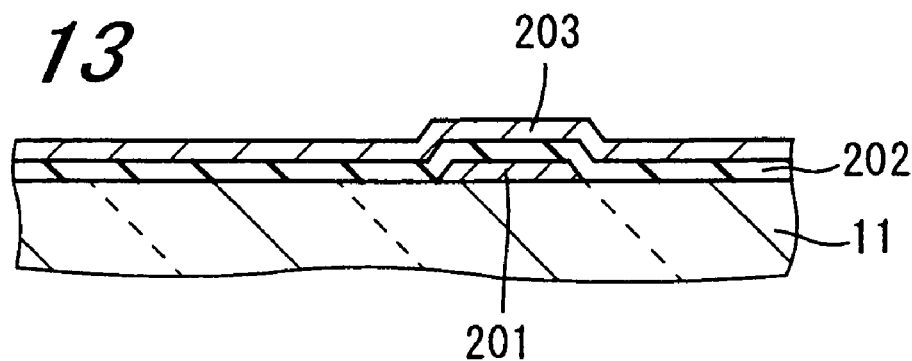
FIG. 13 shows a state where a first semiconductor film is formed.

FIG. 13 shows the state where a first semiconductor film 203 is formed. An amorphous silicon (abbreviated as "a-Si") film, or the like, is formed by CVD, for example, on the surface of the gate insulating film 202 to form the first semiconductor film 203.

Figure 14:
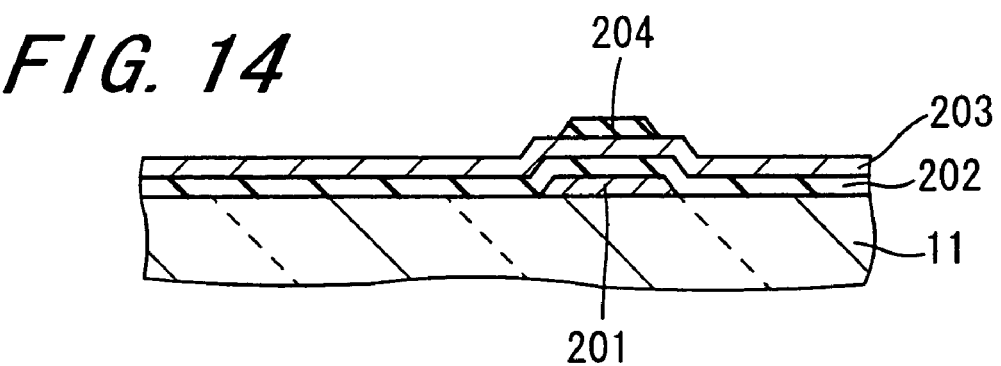
FIG. 14 shows a state where a protective film is formed.

FIG. 14 shows the sate where a protective film 204 is formed. A silicon nitride film (SiNx) film, or the like, is formed by CVD, for example, on the surface of the first semiconductor film 203 and is then patterned by photolithography to form the protective film 204.

Figure 15:
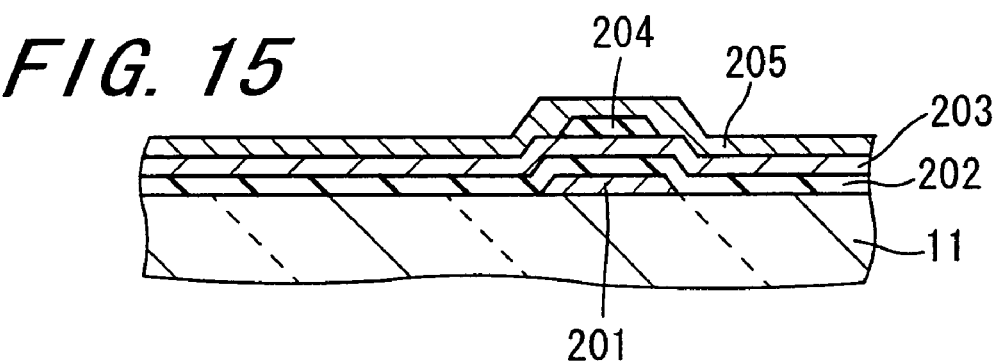
FIG. 15 shows a state where a second semiconductor film is formed.

FIG. 15 shows the state where a second semiconductor film 205 is formed. An amorphous silicon (n⁺ a-Si) film to which an n type impurity such as quintavalent elements including phosphorus, arsenic and antimony is doped in a high concentration is deposited on the surface of the protective film 204 and the first semiconductor film 203 by, for example, CVD to form the second semiconductor film 205.

Figure 16:
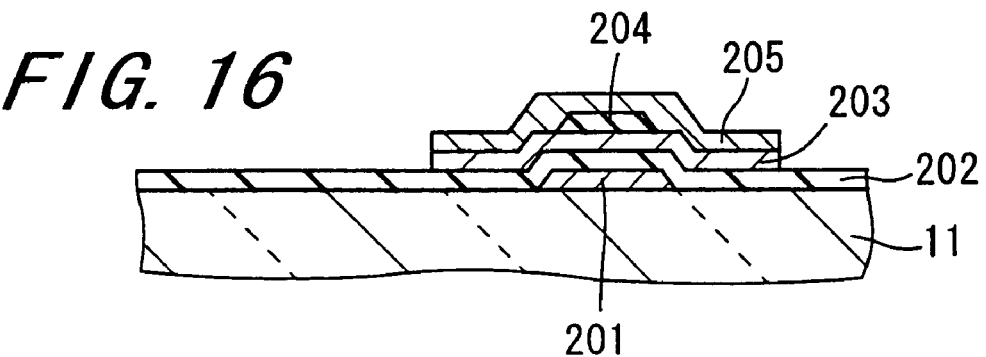
FIG. 16 shows a state where the first semiconductor film and the second semiconductor film are patterned into an island shape.

FIG. 16 shows the state where the first semiconductor film 203 and the second semiconductor film 205 are patterned into an island shape. The first semiconductor film 203 and the second semiconductor film 205 are patterned through dry etching, for example, into the island shape as shown in FIG. 16.

Figure 17:
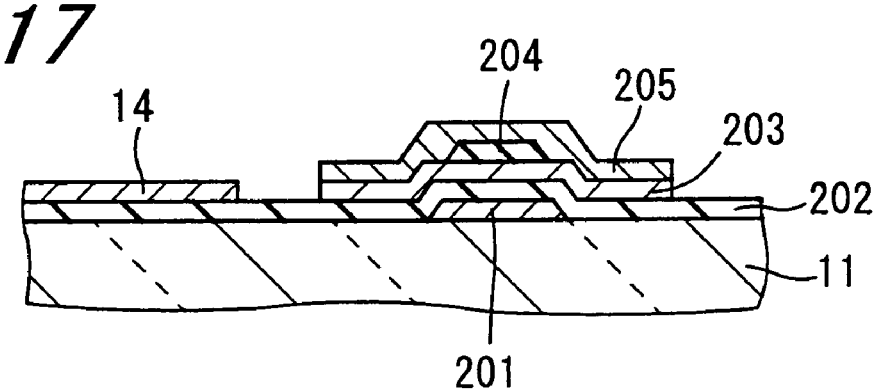
FIG. 17 shows a state where a pixel electrode is formed.

FIG. 17 shows the state where a pixel electrode 14 is formed. An indium-tin oxide (ITO) film, or the like, is formed by sputtering, for example, on the surfaces of the gate insulating film 202, the second semiconductor film 205 and the first semiconductor film 203 and is then patterned by photolithography, for example, to form the pixel electrode 14.

Figure 18:
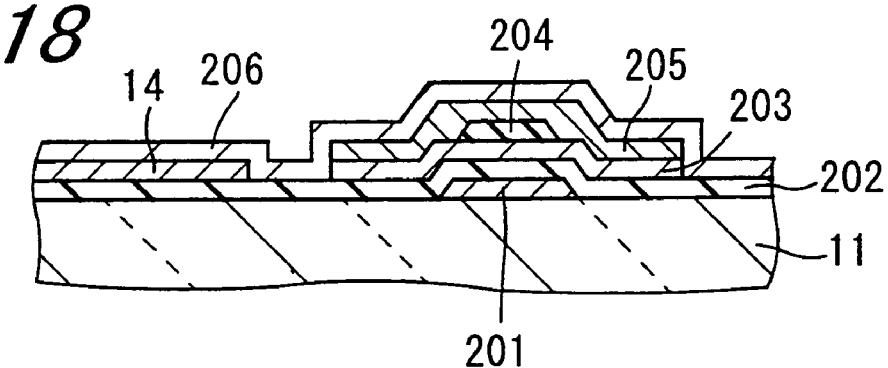
FIG. 18 shows a state where an electrode film is formed.

FIG. 18 shows the state where an electrode 206 is formed. An aluminum (Al) film, for example, is formed through sputtering, for example, on the surfaces of the pixel electrode 14, the gate insulating film 202, the second semiconductor film 205 and the first semiconductor film 203 to form the electrode film 206.

Figure 19:
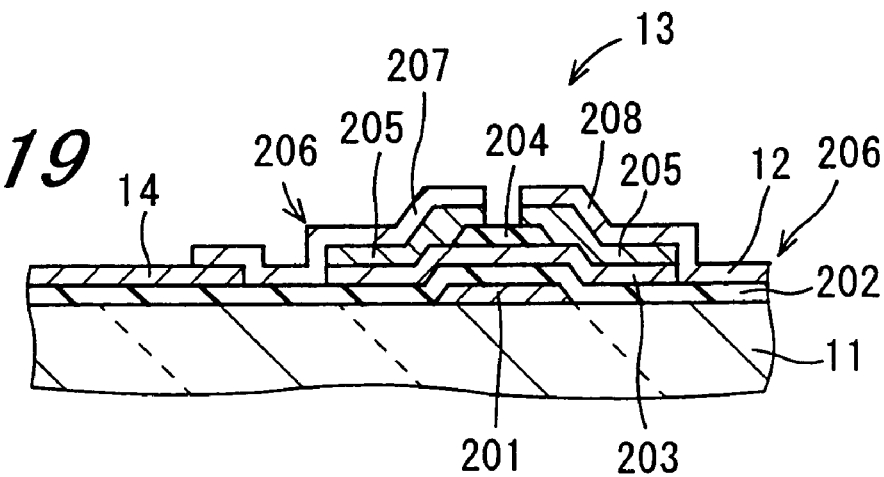
FIG. 19 shows a state where a TFT device and a signal wiring are formed.

FIG. 19 shows the state where a TFT device 13 and a signal wiring 12 are formed. The electrode film 206 and the second semiconductor film 205 are patterned by photolithography, for example, to form a drain electrode 207 electrically connected to the pixel electrode 14, source electrode 208 and the signal wiring 12 electrically connected to the source electrode 208. In consequence, the TFT device 13 is completed.

Figure 20:
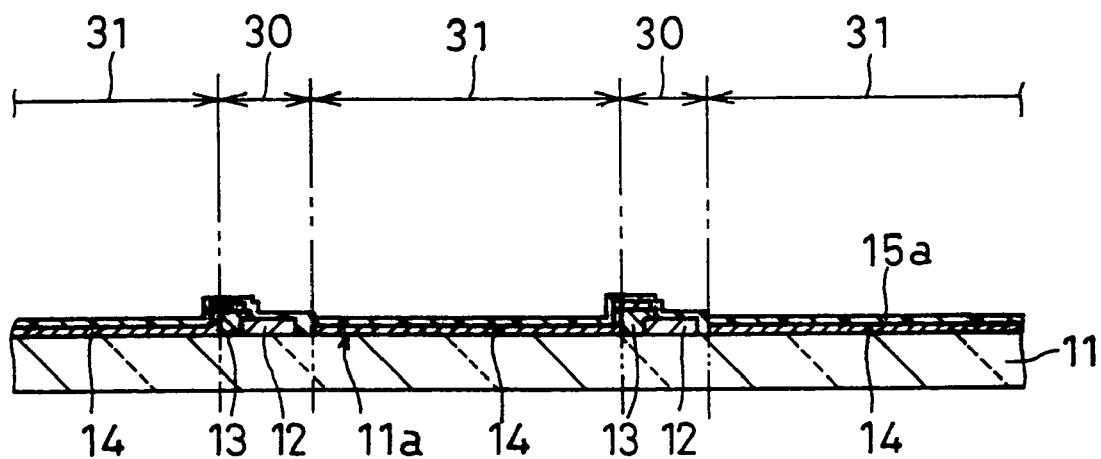
FIG. 20 shows a state where an orientation film is formed.

FIG. 20 shows the state where an orientation film 15a is formed. Incidentally, FIG. 20 shows the gate electrode 201, the gate insulating film 202, the first semiconductor film 203, the protective film 204, the second semiconductor film 205, the drain electrode 207 and the source electrode 208 that are shown in FIG. 19, altogether as the TFT device 13. A material of the orientation film such as polyimide is applied onto the opposing substrate 11 on which the TFT device 13, the signal wiring 12 and the pixel electrode 14 are formed, to form the orientation film 15a.

Figure 21:
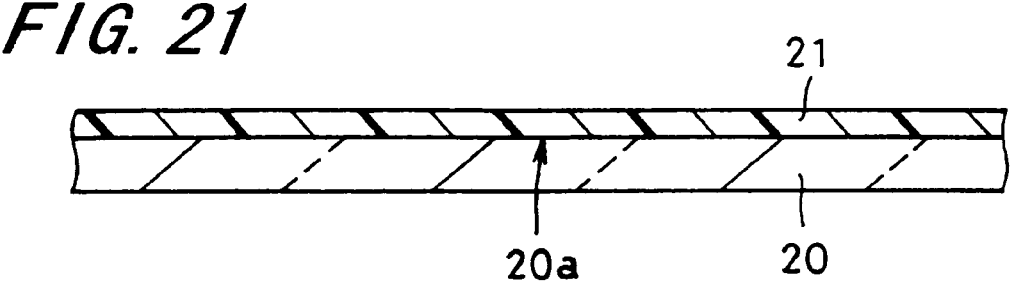
FIG. 21 shows a state where a shading film resist layer is formed on one surface of a transparent substrate.

FIG. 21 shows the state where a shading film resist layer 21 is formed on one surface 20a of the transparent substrate 20. A resist to serve as the shading film 19 is applied by spin coating, for example, onto the one surface 20a of the transparent substrate 20 such as a glass substrate formed of alkali-free glass, for example, and is then dried to form the shading film resist layer 21. A resist having a light transmission factor of 0.1% or below and curable at its portion irradiated with light is used as this resist.

Figure 22:
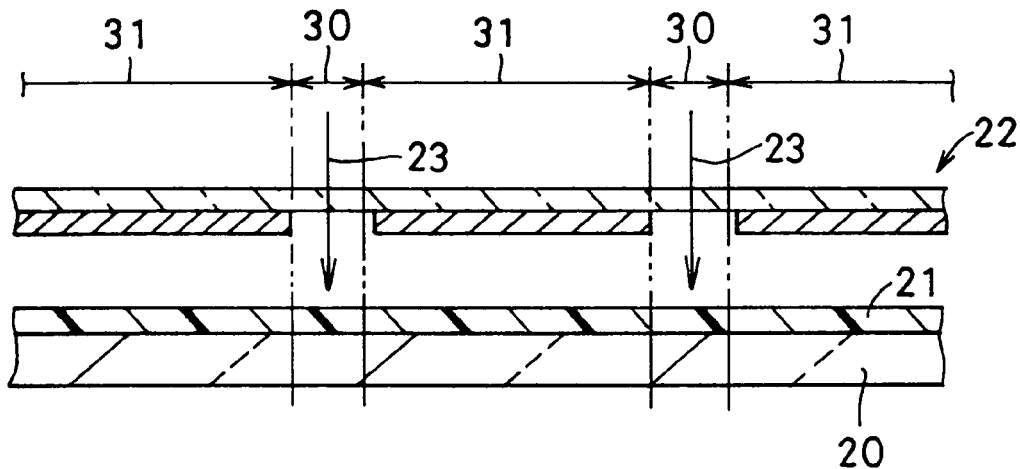
FIG. 22 shows a state where exposure is applied to the shading film resist layer.

FIG. 22 shows the state where exposure is applied to the shading film resist layer 21. Exposure light 23 such as ultraviolet rays are irradiation to the shading film resist layer 21 on at least a predetermined portion to be the non-display portion 30 of the transparent substrate 20, by use of a photo-mask 22.

Figure 23:
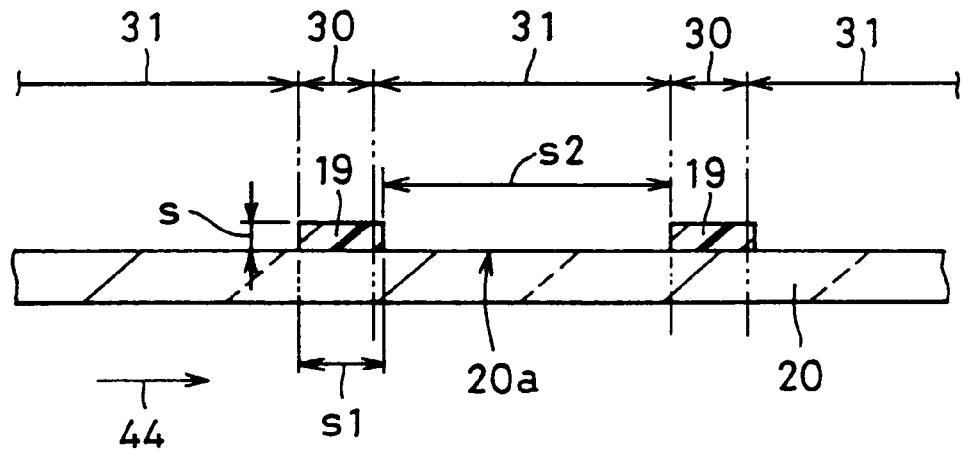
FIG. 23 shows a state where a shading film is formed on one surface of a transparent substrate.

FIG. 23 shows the state where a shading film 19 is formed on the one surface 20a of the transparent substrate 20. The shading film resist layer 21 to which exposure is applied is developed by use of an alkaline developing solution, for example, and is then baked to form the shading film 19 to be the non-display portion 30 on the one surface 20a of the transparent substrate 20 in such a fashion as to correspond to a predetermined portion. The thickness s of the shading film 19 formed in this way is preferably 1.5 μm or below and more preferably 1.0 μm or below. The width s1 in a direction denoted by reference numeral 44 is preferably 6 to 30 μm and more preferably 10 to 20 μm. The gap s2 between the adjacent shading films 19 is preferably at least 50 μm.

Figure 24:
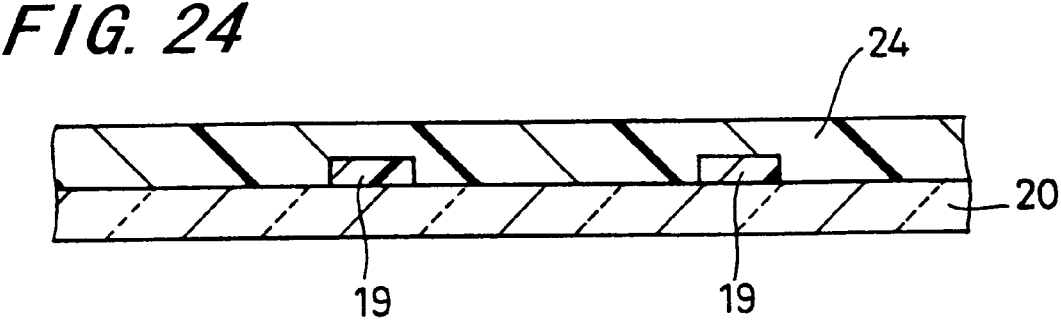
FIG. 24 shows a state where a photo-curable transparent resin layer is formed on a transparent substrate on which a shading film is formed.

FIG. 24 shows the state where a photo-curable transparent resin layer 24 is formed on the transparent substrate 20 on which the shading film 19 is formed. A transparent resin that is photo-curable at portions thereof irradiated with light is applied onto the transparent substrate 20 on which the shading film 19 is formed to form the photo-curable transparent resin layer 24.

Figure 25:
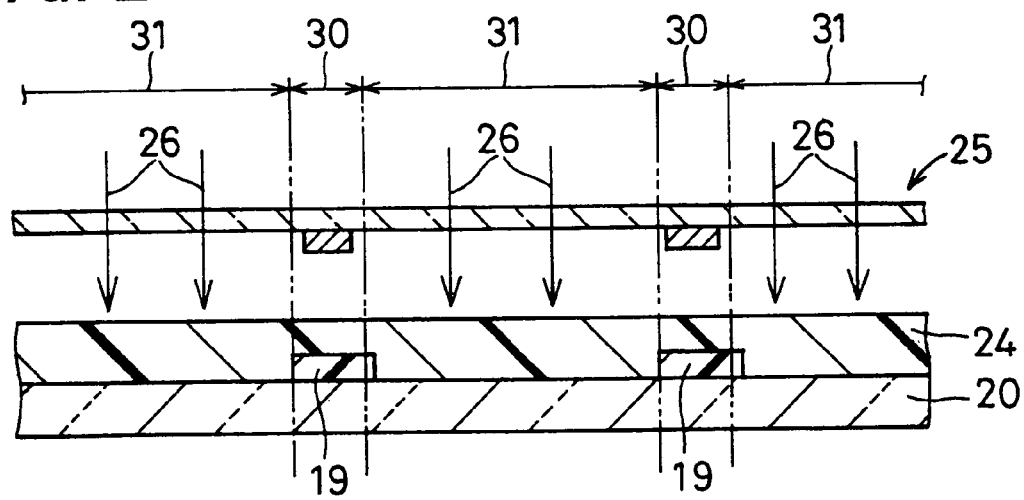
FIG. 25 shows a state where exposure is applied to a photo-curing type transparent resin layer.

FIG. 25 shows the state where exposure is applied to the photo-curable transparent resin layer 24. Exposure light 26 such as ultraviolet rays is irradiated to the photo-curable transparent resin layer 24 on the predetermined portion to be a display portion 31 of the transparent substrate 20, by use of a photo-mask 25. In consequence, solubility of the photo-curable transparent resin layer 24 at the predetermined portion to be the display portion 31 to a developing solution can be made lower than solubility at other positions.

Figure 26:
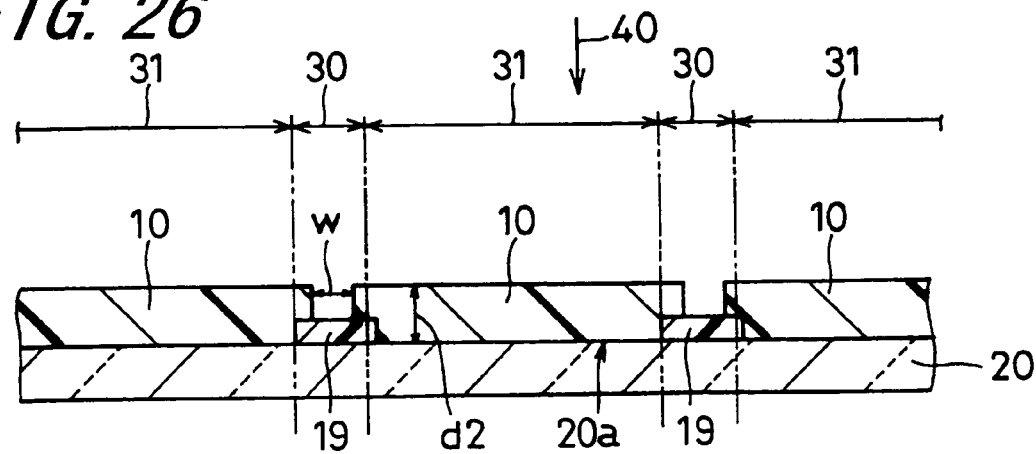
FIG. 26 shows a state where a transparent layer is formed.

FIG. 26 shows the state where a transparent layer 10 is formed. After the exposed photo-curable transparent resin layer 24 is developed by use of the developing solution, this resin layer 24 is baked to form the transparent layer 10 on at least the portion of the one surface 20a of the transparent substrate 20 corresponding to the predetermined portion to be the display portion 31.

Figure 27:
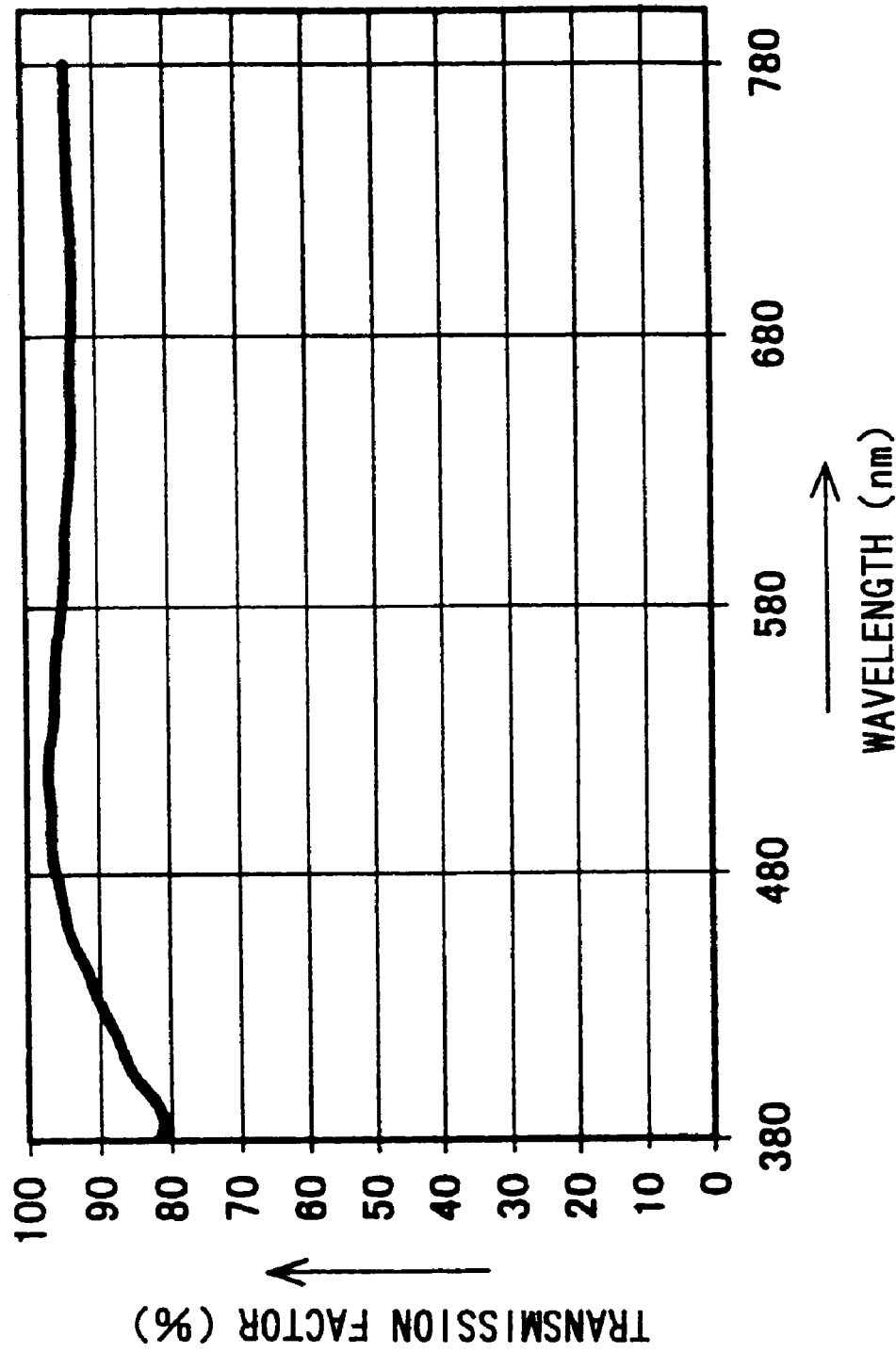
FIG. 27 shows a relation between a wavelength of light and a transmission factor when light of 380 nm to 780 nm is allowed to transmit through the transparent layer shown in FIG. 26 from a direction indicated by an arrow 40.

The mean transmission factor of the transparent layer 10 formed in this way to the visible ray region is at least 80% as described already. FIG. 27 is a graph showing the relationship between the wavelength of light and the transmission factor when light of 380 to 780 nm is allowed to transmit the transparent layer 10 shown in FIG. 26 from the direction indicated by an arrow 40. The abscissa represents the wavelength (nm) and the ordinate does the transmission factor (%). The transmission factor is measured by use of OSP-SP200, a product of Olympus Optical Industry, Co. The transmission factor at this time is tabulated in a 5 nm unit in Table 1.

TABLE 1

| Wavelength (nm) | Transmission factor (%) |
| --- | --- |
| 380 | 81.8 |
| 385 | 80.9 |
| 390 | 81.3 |
| 395 | 82.4 |
| 400 | 83.9 |
| 405 | 85.4 |
| 410 | 86.3 |
| 415 | 87.0 |
| 420 | 87.8 |
| 425 | 88.8 |
| 430 | 89.8 |
| 435 | 90.6 |
| 440 | 91.2 |
| 445 | 92.0 |
| 450 | 92.9 |
| 455 | 93.8 |
| 460 | 94.4 |
| 465 | 94.8 |
| 470 | 95.1 |
| 475 | 95.5 |
| 480 | 96.0 |
| 485 | 96.4 |
| 490 | 96.6 |
| 495 | 96.6 |
| 500 | 96.6 |
| 505 | 96.6 |

TABLE 1-continued

| Wavelength (nm) | Transmission factor (%) |
| --- | --- |
| 510 | 96.7 |
| 515 | 96.9 |
| 520 | 96.9 |
| 525 | 96.8 |
| 530 | 96.6 |
| 535 | 96.3 |
| 540 | 96.1 |
| 545 | 96.1 |
| 550 | 96.0 |
| 555 | 96.0 |
| 560 | 95.9 |
| 565 | 95.7 |
| 570 | 95.4 |
| 575 | 95.2 |
| 580 | 94.9 |
| 585 | 94.7 |
| 590 | 94.6 |
| 595 | 94.5 |
| 600 | 94.5 |
| 605 | 94.5 |
| 610 | 94.4 |
| 615 | 94.2 |
| 620 | 94.0 |
| 625 | 93.8 |
| 630 | 93.6 |
| 635 | 93.5 |
| 640 | 93.4 |
| 645 | 93.4 |
| 650 | 93.4 |
| 655 | 93.4 |
| 660 | 93.5 |
| 665 | 93.5 |
| 670 | 93.4 |
| 675 | 93.4 |
| 680 | 93.3 |
| 685 | 93.2 |
| 690 | 93.2 |
| 695 | 93.1 |
| 700 | 93.1 |
| 705 | 93.1 |
| 710 | 93.2 |
| 715 | 93.2 |
| 720 | 93.3 |
| 725 | 93.4 |
| 730 | 93.5 |
| 735 | 93.7 |
| 740 | 93.7 |
| 745 | 93.7 |
| 750 | 93.8 |
| 755 | 93.8 |
| 760 | 93.8 |
| 765 | 93.9 |
| 770 | 93.8 |
| 775 | 93.9 |
| 780 | 93.9 |

The thickness d2 of the transparent layer 10 at the position corresponding to the display portion 31 is preferably 2.0 μm or below and more preferably 1.0 to 1.5 μm. When the transparent layer 10 is formed, the thickness of the transparent layer 10 has variance of 5 to 10%. When the thickness of the transparent layer 10 is set to 2.0 μm or below as described above, however, variance of the thickness of the transparent layer 10 can be set to 0.2 μm or below. Therefore, because variance of the thickness of the liquid crystal layer 17 can be reduced at the portion at which the transparent layer 10 is formed, the drop of display quality resulting from the thickness of the liquid crystal layer 17 can be prevented. The gap w between the adjacent transparent layers 10 is preferably at least 0 μm and more preferably at least 3 μm.

Figure 28:
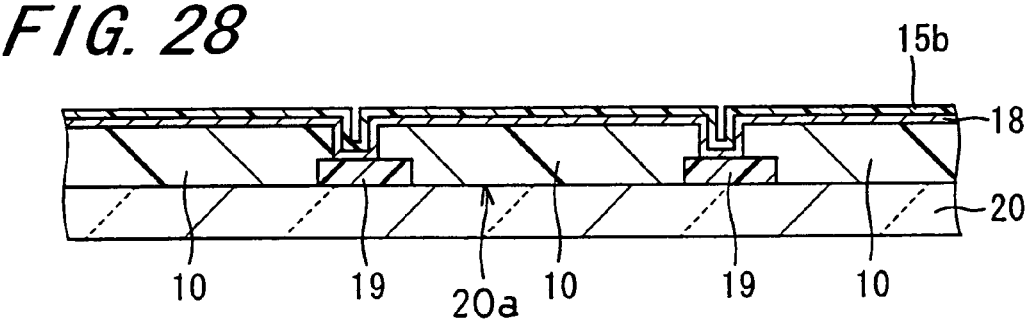
FIG. 28 shows a state where a thin film electrode and an orientation film are formed.

FIG. 28 shows the state where a thin film electrode 18 and an orientation film 15b are formed. A thin film of an indium-tin alloy oxide (ITO), or the like, is formed by sputtering on the transparent substrate 20 on which the transparent layer 10 is formed, to form the thin film electrode 18. The film formed of the indium-tin alloy oxide (ITO) has a transmission factor of 90% and sufficiently transmits light. Therefore, the thin film electrode 18 is preferably formed of ITO. A material of an orientation film such as polyimide is applied to the transparent substrate 20 on which the thin film electrode 18 is formed, to form the orientation film 15b.

Figure 29:
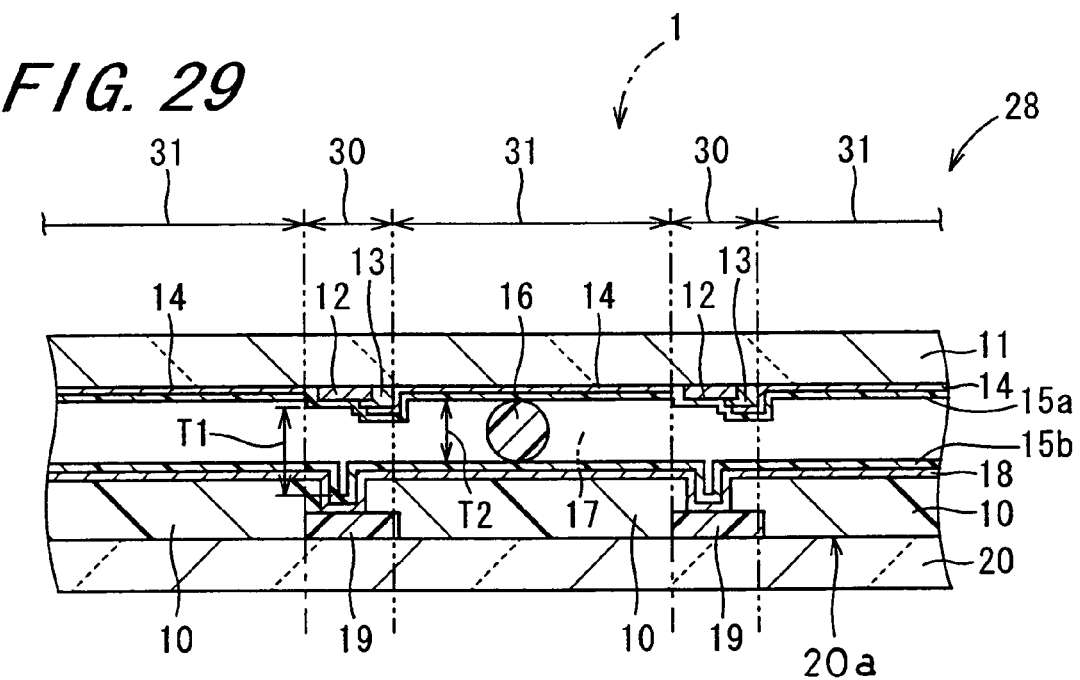
FIG. 29 shows a state where a transparent substrate and an opposing substrate are bonded to each other.

FIG. 29 shows the state where the transparent substrate 20 and the opposing substrate 11 are bonded to each other. The surface 11a of the opposing substrate 11 having the pixel electrode 14 formed thereon in FIG. 20 and the surface 20a of the transparent substrate 20 having the transparent layer 10 formed thereon in FIG. 28 are so arranged as to oppose each other, and a spacer 16 made of glass or plastic is sandwiched between the two substrates. The portions other than the portion correspoding to the predetermined portion to be the injection port 27 shown in FIG. 4 are bonded with a sealant to form the injection port 27. In consequence, a liquid crystal cell 28 formed by bonding the opposing substrate 11 and the transparent substrate 20 can be acquired. The internal pressure of the liquid crystal cell 28 is reduced so as to reach a sufficient vacuum condition. The end portion of the liquid crystal cell 28 in which the injection port 27 is formed is immersed into a liquid crystal reservoir, not shown. While the immersion state is kept as such, the pressure of the liquid crystal cell 28 and the pressure around the liquid crystal reservoir are elevated to the atmospheric pressure. The liquid crystal is then charged from the injection port 27 between the opposing substrate 11 and the transparent substrate 20, that is, into the liquid crystal cell 28, to form the liquid crystal layer 17. Next, the injection port 27 is sealed. The liquid crystal display apparatus 1 shown in FIG. 1 can be obtained in this way.

FIGS. 30A to 30C show the case where the transparent layer 10 is formed in contrast with the case where the transparent layer 10 is not formed. FIG. 30A schematically shows the construction in which the transparent layer 10 is formed in accordance with the embodiment. FIG. 30B schematically shows another construction in which the transparent layer 10 is formed. FIG. 30C schematically shows the construction in which the transparent layer 10 is not formed. Incidentally, these FIGS. 30A to 30C show only the opposing substrate 11, the signal wiring 12, the TFT device 13, the transparent layer 10, the shading film 19 and the transparent substrate 20. In FIGS. 30A to 30C, further, the gap T2 is equal.

As described above, in the production method of the liquid crystal display apparatus 1 according to this embodiment, the transparent layer 10 is formed on at least the portion of the one surface 20a of the transparent substrate 20 corresponding to the predetermined portion to be the display portion 31 in the steps shown in FIGS. 24 to 26. Therefore, when the opposing substrate 11 and the transparent substrate 20 are bonded to each other as shown in FIGS. 30A and 30B, the gap T1 defined by the surface layer of the opposing substrate 11 and the surface layer of the transparent substrate 20 in the non-display portion 30 can be increased without changing the gap T2 defined by the surface layer of the opposing substrate 11 and the surface layer of the transparent substrate 20 in the display portion 31.

When the transparent layer 10 is not formed on the one surface 20a of the transparent substrate 20 in such a fashion as to correspond to the predetermined portion to be the display portion 31 as shown in FIG. 30C, the gap T1 of the non-display portion 30 depends on the gap T2 of the display portion 31. Therefore, the gap T2 must be increased in order to increase the gap T1. In other words, it is not possible to increase the gap T1 without changing the gap T2. When the gap T2 is increased to increase the gap T1, however, the amount of the liquid crystal injected between the opposing substrate 11 and the transparent substrate 20 increases and the injection time of the liquid crystal gets elongated. When the gap T2 becomes excessively great, it is difficult to make the gap T2 uniform throughout the entire substrate, and display defect occurs in the liquid crystal display apparatus produced.

As described above, the production method of the liquid crystal display apparatus 1 according to the embodiment forms the transparent layer 10 on at least the portion of the one surface 20a of the transparent substrate 20 corresponding to the predetermined portion to be the display portion 31. Therefore, even when the gap between the opposing substrate 11 and the transparent substrate 20 is increased so as to increase the gap T1 described above, the increment of the gap T2 can be made smaller than the increment of the gap between the opposing substrate 11 and the transparent substrate 20 by adjusting the thickness of the transparent layer 10. In other words, the gap T1 can be increased as shown in FIG. 30B without changing the gap T2, or the gap T1 can be made greater than the gap T2 as shown in FIG. 30A. Therefore, it is possible to increase the sectional area of the surface of the portion to operate as the liquid crystal layer 17 of the non-display portion 30 substantially perpendicular to the opposing substrate 11 and to the transparent substrate 20, to secure the fluidization path of the liquid crystal in the non-display portion 30 in which the TFT device 13 and the signal wiring 12 are arranged when the liquid crystal is injected between the opposing substrate 11 and the transparent substrate 20, and to lower the fluidization resistance. It is thus possible to increase the injection speed of the liquid crystal, to shorten the injection time and to improve productivity. It is further possible to produce a large-scale liquid crystal display apparatus.

In this embodiment, after the shading film 19 is formed on the one surface 20a of the transparent substrate 20 in such a fashion as to correspond to the predetermined portion to be the non-display portion 30, the transparent layer 10 is formed on at least the portion of the surface 20a of the transparent substrate 20 corresponding to the predetermined portion to be the display portion 31. Therefore, even when the shading film 19 is formed in such a fashion as to correspond to the predetermined portion to be the non-display portion 30, it is possible to increase the gap T1 defined by the surface layer of the opposing substrate 11 and the surface layer of the transparent substrate 20 in the non-display portion 30, to secure the fluidization path of the liquid crystal when the liquid crystal is injected between the opposing substrate 11 and the transparent substrate 20 and to lower the fluidization resistance. It becomes thus possible to produce the liquid crystal display apparatus having the shading film 19 in the non-display portion 30 in which the TFT device 13 and the signal wiring 12 are arranged and having reduced display defect, without lowering the injection speed of the liquid crystal.

As shown in FIGS. 24 to 26, this transparent layer 10 is formed by the steps of forming a photo-curable transparent resin layer 24 having such a property that a portion irradiated with light is cured, on the one surface 20a of the transparent substrate 20, irradiating light to the portion of the one surface 20a of the transparent substrate 20 corresponding to the predetermined portion to be the display portion 31 and then conducting development. Therefore, it is easy to form the transparent layer 10 on at least the portion of the one surface 20a of the transparent substrate 20 corresponding to the predetermined portion to be the display portion 31.

The method of forming the transparent layer 10 is not limited to the method described above. The transparent layer 10 may be formed by the steps of forming a decomposition type transparent resin layer from a transparent resin having a property of decomposition at its part irradiated with light on the one surface 20a of the transparent substrate 20, irradiating light to positions other than the predetermined portion to be the display portion 31, and then conducting development. The transparent layer 10 may further be formed by the steps of forming a transparent resin layer by use of a transparent resin on the one surface 20a of the transparent substrate 20, forming a resist layer on the surface of the transparent resin layer, applying exposure in such a fashion that solubility of the resist layer in at least the portion corresponding to the predetermined portion to be the display portion 31 to a developing agent is lower than solubility of other portions to the developing agent, then conducting development and removing the transparent resin layer at the position from which the resist layer is removed. Furthermore, the transparent layer 10 may be formed by a lift-off method.

FIGS. 31 to 34 schematically show each process step when the transparent layer 10 is formed by the lift-off method. When the transparent layer 10 is formed by use of the lift-off method, the steps shown in FIGS. 31 to 34 are carried out in place of the steps shown in FIGS. 24 to 26.

Figure 31:
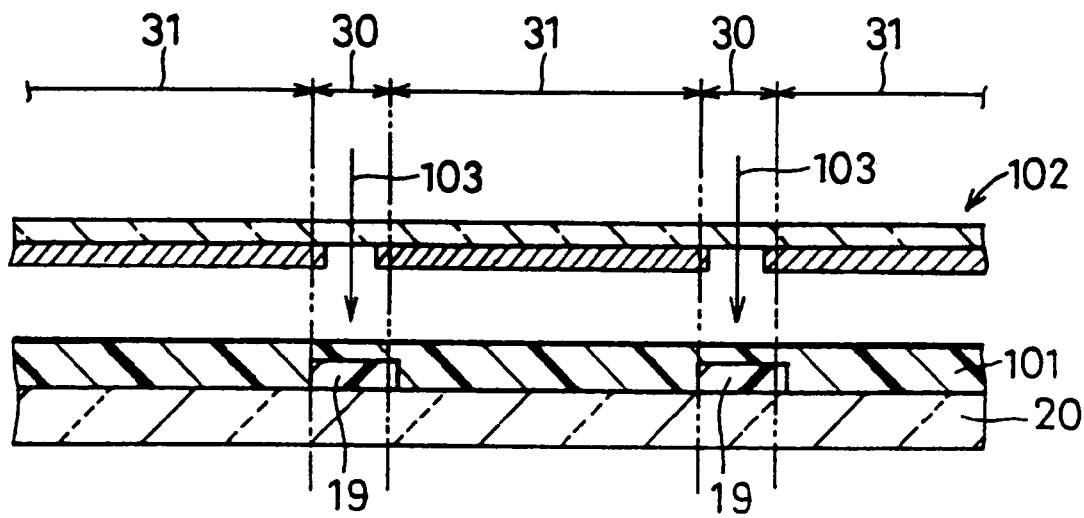
FIG. 31 shows a state where exposure is applied to a resist layer.

FIG. 31 shows the state where exposure is applied to a resist layer 101. A negative type resist having a property of curing at its portion irradiated with light is applied to the transparent substrate 20 on which the shading film 19 is formed to form the resist layer 101. Light for exposure 103 such as ultraviolet rays is irradiated through a photo-mask 102 to the resist layer 101 in at least the portion corresponding to a predetermined portion to be the display portion 31. In this way, solubility of the resist layer 101 in at least the portion corresponding to the predetermined portion to be the display portion 31 to a developing agent can be made higher than those in portions other than the portion corresponding to the predetermined portion.

Figure 32:
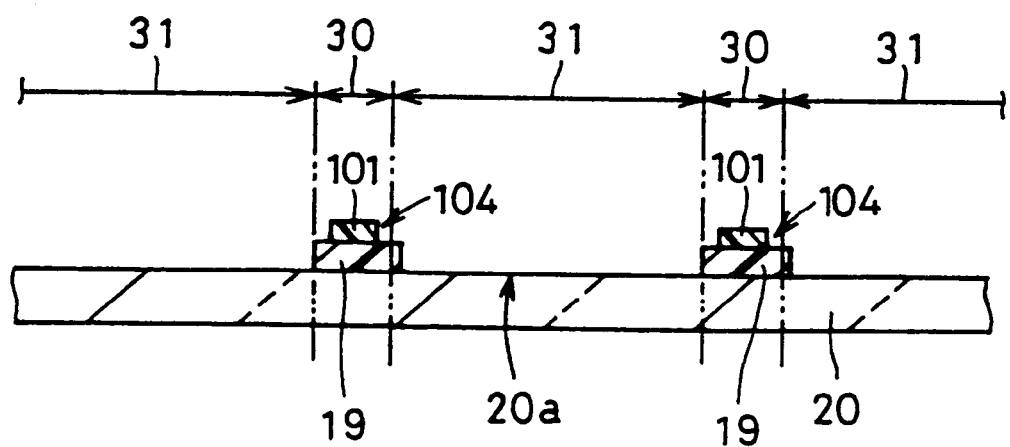
FIG. 32 shows a state where a resist layer is developed.

FIG. 32 shows the state where the resist layer 101 is developed. The resist layer 101 exposed is developed by use of a developing solution. In consequence, the resist layer 101 on the predetermined portion to be at least the display portion 31 is removed, and a resist pattern 104 is formed.

Figure 33:
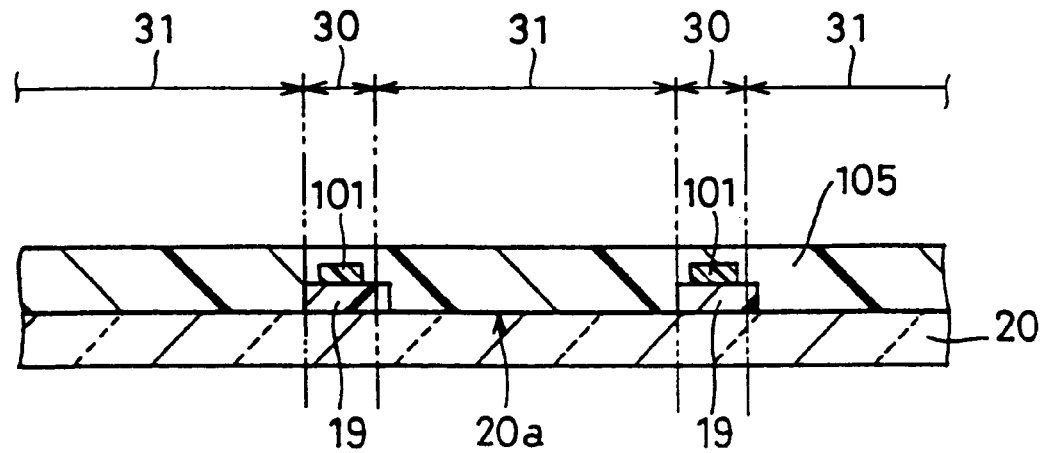
FIG. 33 shows a state where a transparent resist layer is formed.

FIG. 33 shows the state where a transparent resin layer 105 is formed. A transparent resin is applied by spin coating, or the like, in such a fashion as to cover the one surface 20a of the transparent substrate 20 at the position from which the resist layer 101 is removed, the surface of the shading film 19 and the surface of the resist layer 101 to form the transparent resin layer 105.

Figure 34:
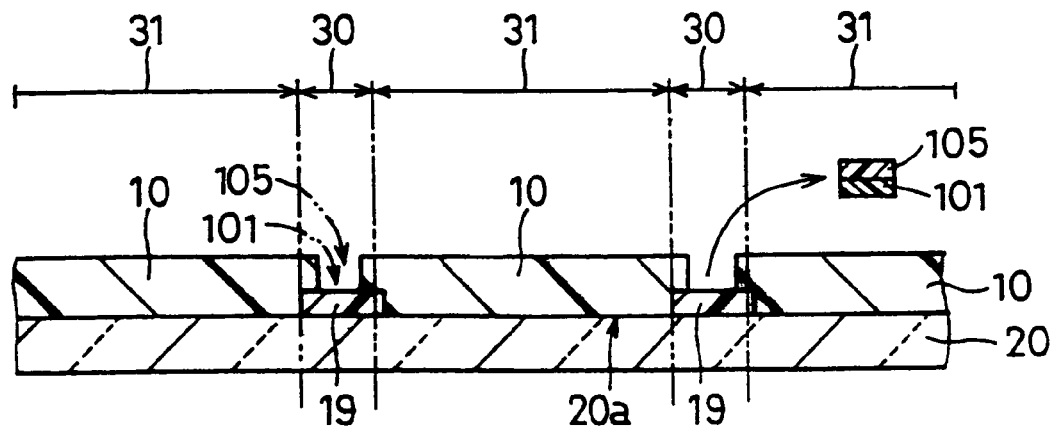
FIG. 34 shows a state where the resist layer and the transparent resin layer on the surface of the resist layer are removed.

FIG. 34 shows the state where the resist layer 101 and the transparent resin layer 105 on the surface of the resist layer 101 are removed. The transparent substrate 20 having the transparent resin layer 105 formed thereon is immersed in a peeling solution of the resist layer 101 whereby the resist layer 101 is dissolved and peeled from the shading film 19. At this time, the transparent resin layer 105 formed on the surface of the resist layer 101 is simultaneously removed. As a result, the transparent layer 10 is formed.

In the steps shown in FIGS. 31 to 34, the resist layer 101 is formed of the negative type resist having the property of curing at its part irradiated with light but is not limited thereto. The resist layer 101 may be formed of a positive type resist having a property of decomposition at its part irradiated with light, too. In this case, the rays of light for exposure 103 are irradiated to the resist layer 101 on the predetermined portion to be at least the display portion 31 in the process steps shown in FIG. 31.

The shading film 19 is formed of the resin but is not limited thereto. Namely, the shading film 19 may be formed of a metal such as chromium, too.

Figure 35:
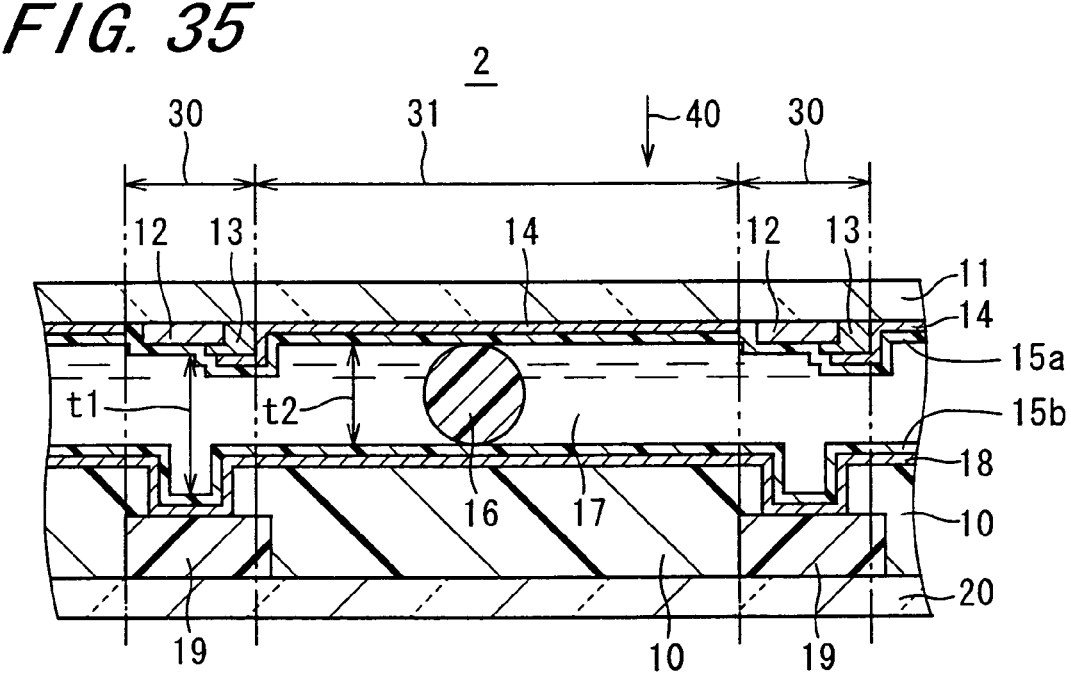
FIG. 35 is a schematic sectional view showing a construction of a liquid crystal display apparatus according to a second embodiment of the invention in a simplified form.
Figure 36A:
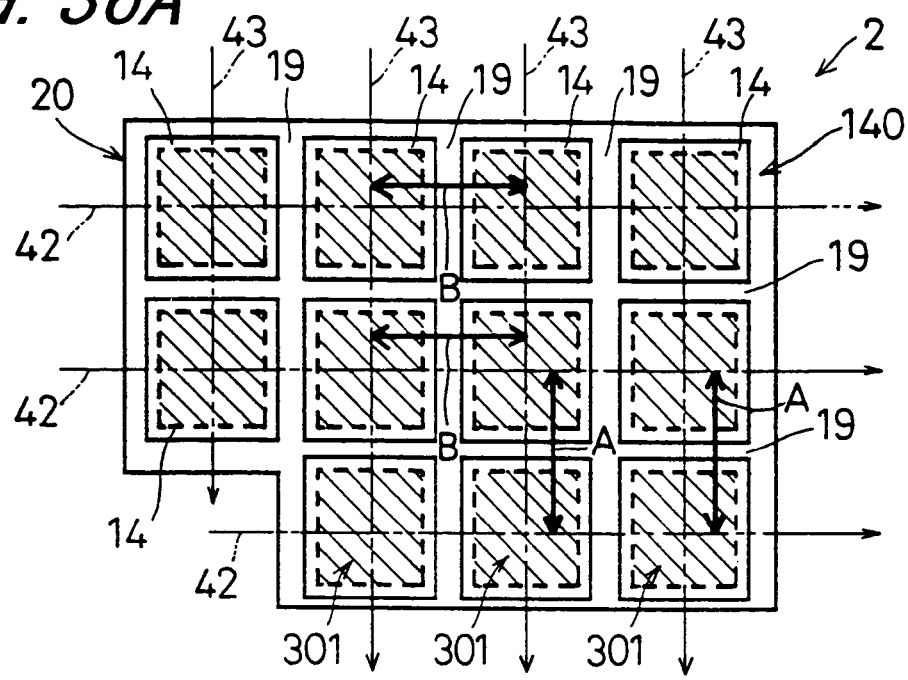
FIGS. 36A to 36c show a positional relationship between a shading film and a pixel electrode and a positional relationship between the shading film and a transparent layer.
Figure 36B:
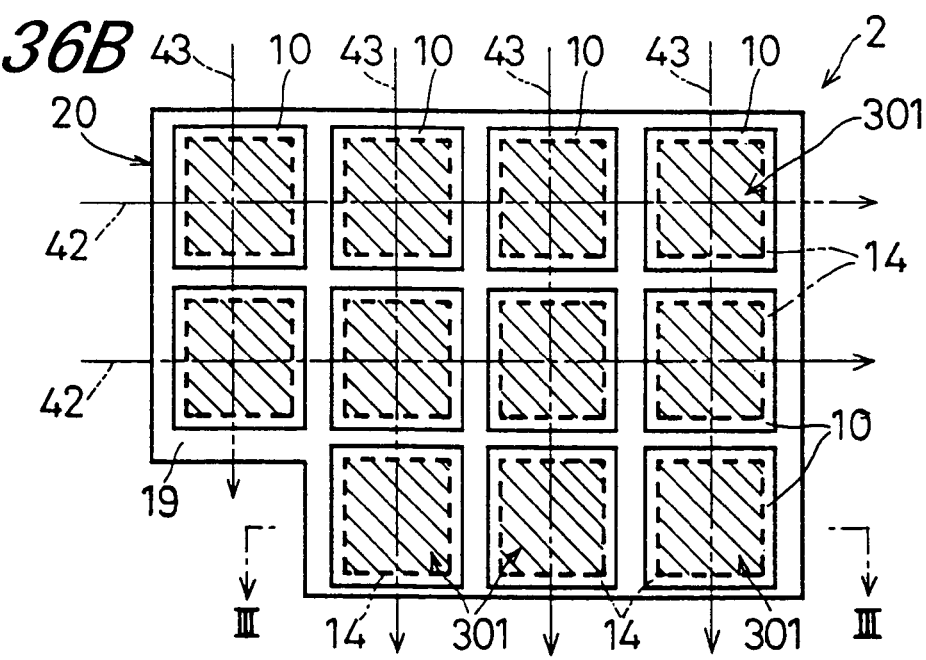
Figure 36C:
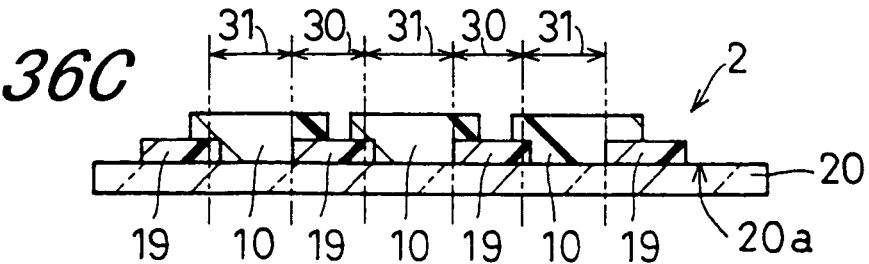

FIG. 35 is a schematic sectional view showing in a simplified form a construction of a liquid crystal display apparatus 2 according to the second embodiment of the invention. FIGS. 36A to 36C show the positional relationship between the shading film 19 and the pixel electrode 14 and the positional relationship between the shading film 19 and the transparent layer 10. FIG. 36A is a plan view schematically showing the positional relationship between the shading film 19 and the pixel electrode 14 when viewed from a direction indicated by an arrow 40 in FIG. 35. FIG. 36B is a plan view schematically showing the positional relationship between the shading film 19 and the transparent layer 10 when viewed from the direction indicated by the arrow 40 in FIG. 35. FIG. 36C is a sectional view taken along a line III—III of FIG. 36B. Incidentally, FIG. 36A shows only the shading film 19, the pixel electrode 14 and the transparent substrate 20, and FIGS. 36B and 36C show only the shading film 19, the transparent layer 10 and the transparent substrate 20. The liquid crystal display apparatus 2 according to this embodiment is analogous to the liquid crystal display apparatus 1 of the first embodiment. Therefore, the same reference numeral will be used to identify the corresponding portion and its explanation will be omitted.

It is noteworthy that the shading film 19 is so arranged at the position between the rows of the pixel electrode matrix 140 as to extend in a direction parallel to the row direction 42 of the pixel electrode matrix 140 in addition to the position between columns of the pixel electrode matrix 140.

As shown in FIG. 36A, the shading films 19 are so arranged at positions between the rows of the pixel electrode matrix 140 as to extend in a direction parallel to the row direction 42 of the pixel electrode matrix 140 and at positions between the columns of the pixel electrode matrix 140 as to extend in a direction parallel to the column direction 43 of the pixel electrode matrix 140. In other words, the shading films 19 are arranged in matrix. The light transmission portions 301 indicated by oblique lines have a mosaic arrangement in which the light transmission portions 301 are arranged in matrix in the same way as the pixel electrodes 14 that constitute the pixel electrode matrix 140. Accordingly, a liquid crystal display apparatus in which display of oblique lines inclining to the row and column directions 42 and 43 of the pixel electrode matrix 140 is excellent and which is widely used for measuring instruments can be acquired.

The transparent substrate 20 has the transparent layer 10 disposed at least on the portion of its surface 20a facing the opposing substrate 11 which portion corresponds to the display portion 31 in the same way as the liquid crystal display apparatus 1 according to the first embodiment. The transparent layers 10 are arranged in matrix at positions corresponding to the rows and columns of the pixel electrode matrix 140 at which the shading film 19 is not formed as shown in FIG. 36B in the same way as a plurality of pixel electrodes 14 constituting the pixel electrode matrix 140.

Therefore, as shown in FIGS. 36A to 36C, it is possible to increase the injection speed of the liquid crystal, to shorten the injection time and to improve productivity in the production process of the liquid crystal display apparatus having the shading film 19.

Figure 37:
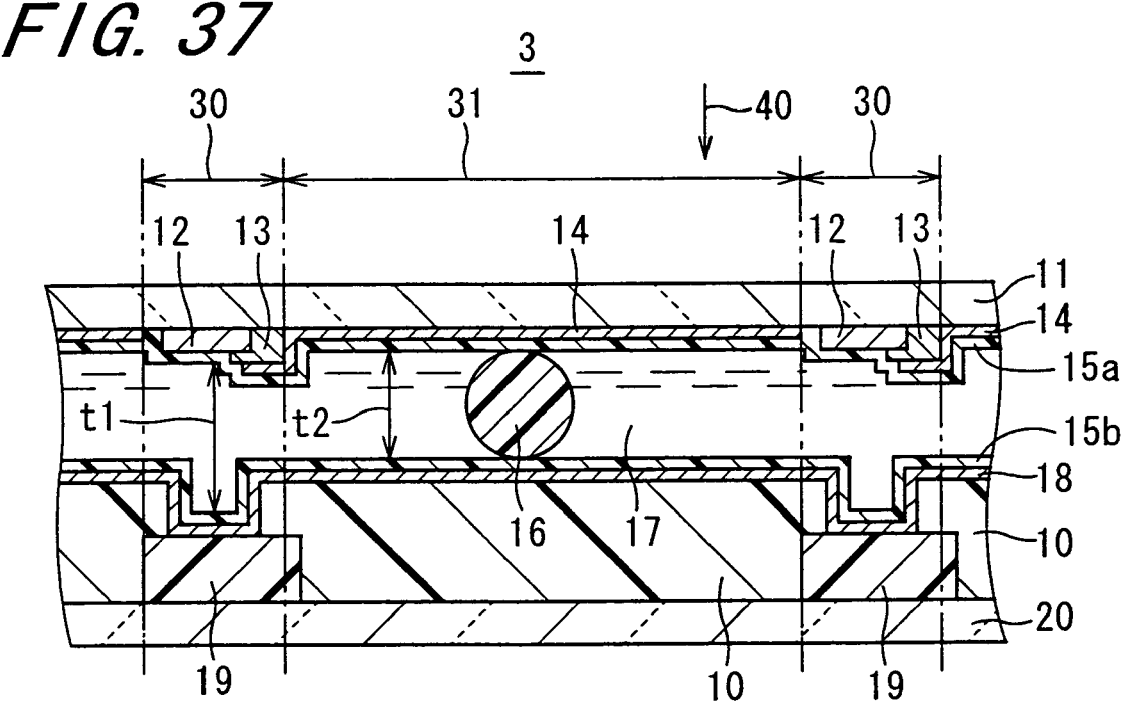
FIG. 37 is a schematic sectional view showing a construction of a liquid crystal display apparatus according to a third embodiment of the invention in a simplified form.
Figure 38A:
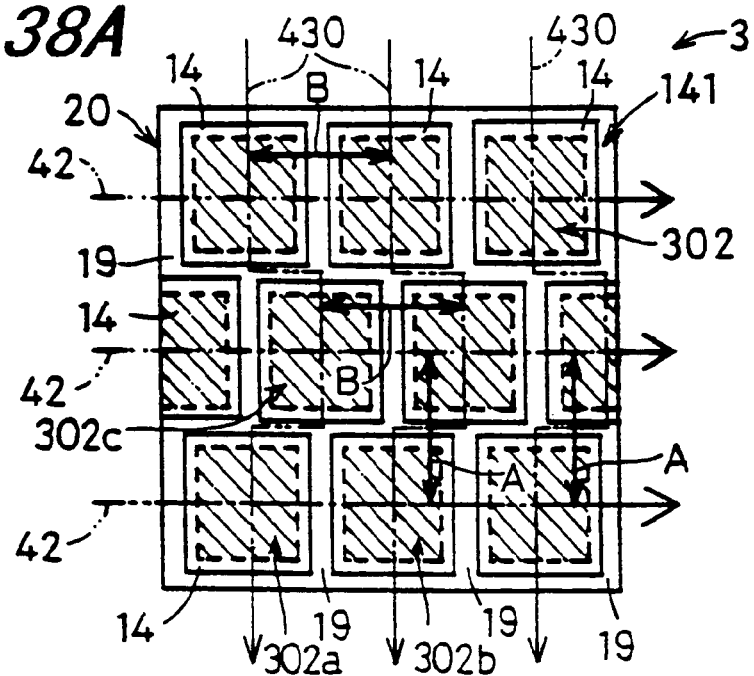
FIGS. 38A to 38C show a positional relationship between a shading film and a pixel electrode and a positional relationship between the shading film and a transparent layer.
Figure 38B:
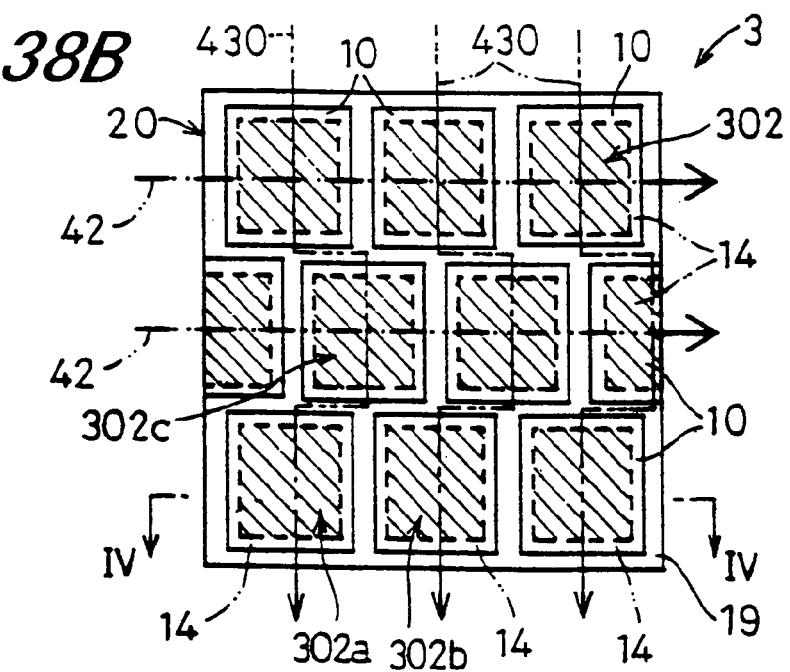
Figure 38C:
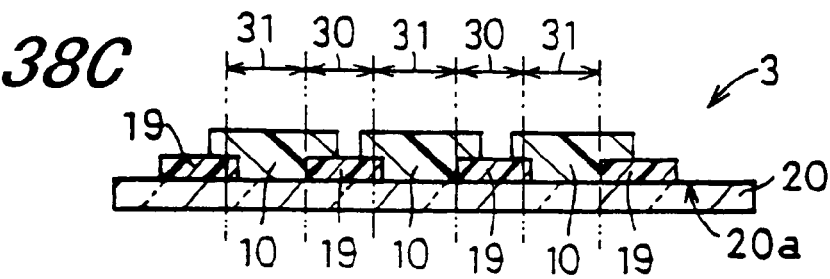
Figure 40:
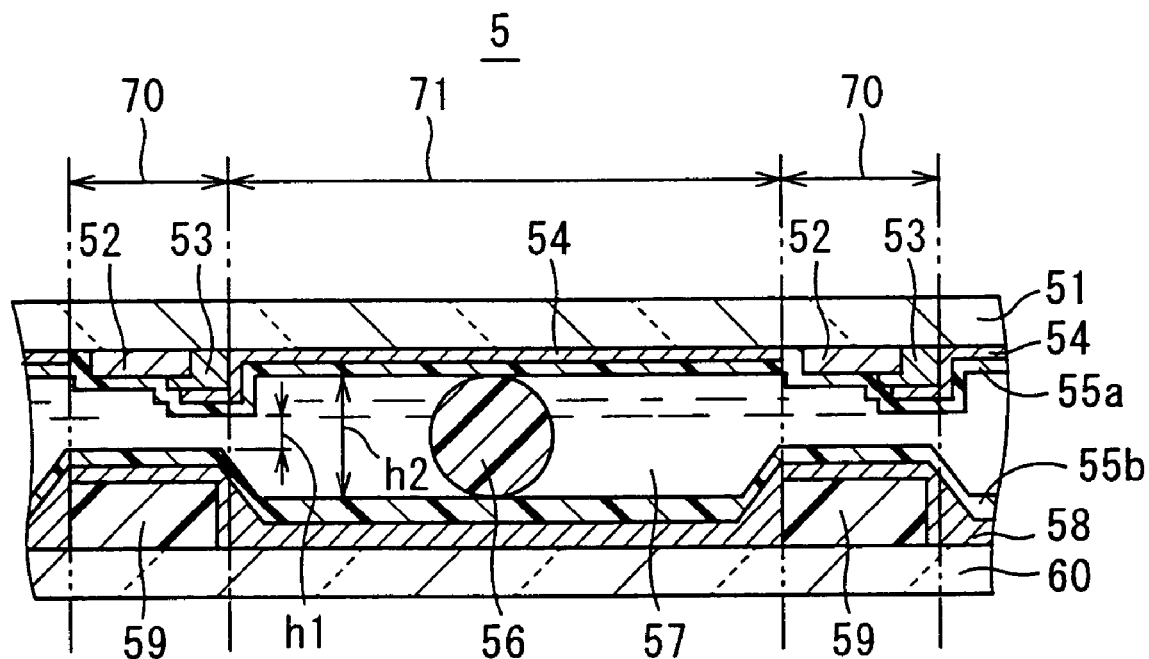
FIG. 40 is a schematic sectional view showing a simplified construction of a black-and-white liquid crystal display apparatus according to the prior art.

FIG. 37 is a schematic sectional view showing in a simplified form a construction of a liquid crystal display apparatus 3 according to the third embodiment of the invention. FIGS. 38A to 38C show the positional relationship between the shading film 19 and the pixel electrode 14 and the positional relationship between the shading film 19 and the transparent layer 10. FIG. 38A is a plan view schematically showing the positional relationship between the shading film 19 and the pixel electrode 14 when viewed from a direction indicated by an arrow 40 in FIG. 37. FIG. 38B is a plan view schematically showing the positional relationship between the shading film 19 and the transparent layer 10 when viewed from the direction indicated by the arrow 40 in FIG. 37. FIG. 38C is a sectional view taken along a line IV—IV of FIG. 38B. Incidentally, FIG. 38A shows only the shading film 19, the pixel electrode 14 and the transparent substrate 20, and FIGS. 38B and 38C show only the shading film 19, the transparent layer 10 and the transparent substrate 20. The liquid crystal display apparatus 3 according to this embodiment is analogous to the liquid crystal display apparatus 1 of the first embodiment. Therefore, the same reference numeral will be used to identify the corresponding portion and its explanation will be omitted.

It is noteworthy that two adjacent rows of the pixel electrode matrix 141 constituted by a plurality of pixel electrodes 14 are arranged in the manner that the arrangement cycle formed by a plurality of the pixel electrodes 14 arranged in the row direction are deviated by about a half cycle from each other, and the shading films 19 are so arranged at positions between the rows of the pixel electrode matrix 141 as to extend in a direction parallel to the row direction 42 of the pixel row matrix 141 and at positions between the columns of the pixel electrode matrix 141 as to extend in the column direction 430 of the pixel electrode matrix 141.

As shown in FIG. 38A, a plurality of pixel electrodes 14 is arranged in matrix with predetermined gaps among them to constitute the pixel electrode matrix 141. Two adjacent rows of the pixel electrode matrix 141 are arranged so that the arrangement cycle defined by a plurality of pixel electrodes 14 arranged in the row direction, that is, a pitch B, deviates from one another by about a half cycle, and two adjacent columns are arranged so that the arrangement cycle defined by a plurality of pixel electrodes 14 arranged in the column direction indicated by reference numeral 430, that is, a pitch A, is coincident with one another. The shading film 19 is disposed at positions between the rows and between the columns of the pixel electrode matrix 141. Since a line indicates the row direction 42 of the pixel electrode 141, the shading film 19 at positions between the rows of the pixel electrode matrix 141 are arranged in a belt form in such a fashion as to extend in a direction parallel to the row direction 42 of the pixel electrode matrix 141. On the other hand, since a belt line indicates the column direction 430 of the pixel electrode matrix 141, the shading film 19 between the columns of the pixel electrode matrix 141 is not disposed in the belt form but along the column direction 430 of the pixel electrode matrix 141. In other words, the light transmission portions 302 indicated by oblique lines have a so-called "delta (Δ) arrangement" in which two adjacent light transmission portions 302a and 302b of one row of the two adjacent rows and one light transmission portion 302c of the other row define a triangle. In consequence, a liquid crystal display apparatus excellent in image display and suitable for television receiver, etc., can be acquired.

The transparent substrate 10 has the transparent layer 10 disposed at least on the portion of its surface 20a facing the opposing substrate 11 corresponds to the display portion 31 in the same way as the liquid crystal display apparatus 1 according to the first embodiment. As shown in FIG. 38B, the transparent layers 10 are arranged in matrix at positions corresponding to the rows and columns of the pixel electrode matrix 141 at which the shading film 19 is not formed, in the same way as a plurality of pixel electrodes 14 constituting the pixel electrode matrix 141. Therefore, as shown in FIGS. 38A to 38C, it becomes possible to increase the injection speed of the liquid crystal, to shorten the injection time and to improve productivity in the production process of the liquid crystal display apparatus having the pixel electrodes 14 and the shading film 19.

The liquid crystal display apparatuss 2 and 3 of the second and third embodiments described above can be produced by changing the shape of the photo-mask 22 used for exposure to form the shading film 19 and shown in FIG. 22 and the shape of the photo-mask 25 used for exposure to form the transparent layer 10 and shown in FIG. 25 in the production method of the liquid crystal display apparatus 1 according to the first embodiment.

EXAMPLE

The invention will be explained in further detail with reference to Examples thereof but is in no way limited thereto.

Example 1

The liquid crystal display 1 shown in FIG. 1 is produced. A display screen 29 has a size of 306 mm in length and 408 mm in width and a length of a diagonal 41 is 20 inches. The pixel electrode 14 is 255 µm in length and 85 µm in width. The number of pixels is 1,200 pixels in a longitudinal direction and 4,800 pixels in a transverse direction.

The signal wiring 12, the TFT devices 13 and the pixel electrodes 14 are formed on one surface 11a of the opposing substrate 11 formed of alkali-free glass. An aluminum (Al) film is used for a gate electrode 201, a drain electrode 207 and a source electrode 208 of each TFT device 13 and for the signal wiring 12. An a-Si film is used for the first semiconductor film 203 and an n$^+$ a-Si film is used for the second semiconductor film 205. An ITO film is used for the pixel electrode 14. A material of an orientation film ("Optomer AL", a product of JSR Co.) is applied to the opposing substrate 11 having the TFT devices 13, the signal wiring 12 and the pixel electrodes 14 formed thereon to form an orientation film 15a.

A resist ("Color Mosaic CM-K", a product of Fuji Film-Orlin Co.) to be the shading film 19 is spin coated to the one surface 20a of the transparent substrate 20 formed of alkali-free glass, and is then dried to form a shading film resist layer 21. Light for exposure 23 is irradiated to the shading film resist layer 21 on a predetermined portion of the one surface 20a to be at least the non-display portion 30. At this time, the exposure light 23 has a wavelength of 365 nm and an exposure dose is 40 to 60 mJ/cm$^2$. The shading film resist layer 21 exposed is developed by use of an alkaline developing solution and is baked to form the shading film 19 on one surface 20a of the transparent substrate 20 and to correspond to a predetermined portion to be the non-display portion 30. The thickness s of the shading film 19 is 1.5 µm, the width s1 is 12 µm and the gap s2 between the adjacent shading films 19 is 85 µm.

A transparent resin ("Optomer NN", a product of JSR Co.) having a property of curing at its portion irradiated with light is applied onto the transparent substrate 20 on which the shading film 19 is formed, to form a photo-curable transparent resin layer 24.

Light for exposure 26 is irradiated to the photo-curable transparent resin layer 24 on a predetermined portion to be at least a display portion 31 of the transparent substrate 20, followed then by development and baking. A transparent layer 10 is thus formed on the one surface 20a of the transparent substrate 20 in such a fashion as to correspond to the predetermined portion to be the display portion 31. The thickness d2 of the transparent layer 10 at the position corresponding to the display portion 31 is 0.5 µm and the gap w between the adjacent transparent layers 10 is 0.0 µm. In other words, the transparent layer 10 is formed on the whole portion of the non-display portion 30.

A thin film of indium-tin alloy oxide (ITO) is formed by sputtering on the transparent substrate 20 on which the transparent layer 10 is formed, to form a thin film electrode 18 is formed. A material of an orientation film ("Optomer AL", a product of JSR Co.) is applied to the transparent substrate 20 on which the thin film electrode 18 is formed, thereby forming an orientation film 15b.

The surface 11a of the opposing substrate 11 on which the pixel electrode 14 is formed and the surface 20a of the transparent substrate 20 on which the transparent layer 10 is formed are so arranged as to oppose each other and a spherical spacer 16 ("micro-pearl", a product of Sekisui Kagaku Kogyo K. K.) having a diameter of 3.5 µm is sandwiched between them. Portions other than a predetermined portion to be an injection port 27 are bonded with a sealant to form the injection port 27. There is thus obtained a liquid crystal cell 28 in which the opposing substrate 11 and the transparent substrate 20 are bonded to each other.

After the internal pressure of the liquid crystal cell 28 is reduced to 2 Pa so as to reach a sufficient vacuum condition, the end portion of the liquid crystal cell 28 at which the injection port 27 is formed is immersed in a liquid crystal reservoir. While the liquid crystal cell 28 is kept immersed in the liquid crystal reservoir, the pressure of the liquid crystal cell 28 and the pressure around the liquid crystal reservoir are elevated to the atmospheric pressure to inject the liquid crystal into the liquid crystal cell 28. In this instance, the time from the start of the elevation of the pressure to the atmospheric pressure to the injection of the liquid crystal into the whole liquid crystal cell 28 is measured and is used as the liquid crystal injection time. Next, the injection port 27 is sealed.

The liquid crystal display apparatus having the construction shown in FIG. 1 is thus produced.

Examples 2 to 16

Fifteen kinds of liquid crystal display apparatuss are produced in the same way as in Example 1 with the exception that the thickness d2 of the transparent layer 10 in the display portion 31 and the gap w between the adjacent transparent layers 10 are changed as tabulated in Table 2 during the formation of the transparent layer 10.

Compartive Example

A liquid crystal display apparatus is produced in the same way as in Example 1 with the exception that the transparent layer 10 is not formed.

However, the liquid crystal cannot be injected into the whole liquid crystal cell.

TABLE 2

| Thickness | d2Gap w (μm) | | | |
|---|---|---|---|---|
| (μm) | 0.0 | 3 | 5 | 8 |
| 0.0 | Comparative Example | — | — | — |
| 0.5 | Example 1 | Example 2 | Example 3 | Example 4 |
| 1.0 | Example 5 | Example 6 | Example 7 | Example 8 |
| 1.5 | Example 9 | Example 10 | Example 11 | Example 12 |
| 2.0 | Example 13 | Example 14 | Example 15 | Example 16 |

Table 3 tabulates the liquid crystal injection time of each liquid crystal display apparatus described above. Incidentally, Table 3 shows the liquid crystal display apparatuss of Examples 1 to 16 and Comparative Example having the thickness d2 and the gap w described above. FIG. 39 shows the relationship between the thickness d2 (μm) of the transparent layer 10 of the display portion 31 and the liquid crystal injection time (min) for each gap w (μm). In FIG. 39, a graph represented by reference numeral 45 shows the relationship when the gap w is 0 μm and a graph represented by reference numeral 46 shows the relationship when the gap w is 3 μm. A graph represented by reference numeral 47 shows the relationship when the gap w is 5 μm and a graph represented by reference numeral 48 shows the relationship when the gap w is 8 μm.

TABLE 3

| | Liquid crystal injection time (min) | | | |
|---|---|---|---|---|
| Thickness d2 | Gap w (μm) | | | |
| (μm) | 0.0 | 3 | 5 | 8 |
| 0.0 | Injection impossible | — | — | — |
| 0.5 | 1240 | 1020 | 920 | 900 |
| 1.0 | 870 | 710 | 690 | 640 |
| 1.5 | 670 | 600 | 580 | 560 |
| 2.0 | 610 | 580 | 570 | 560 |

It can be understood from the comparison of Examples 1 to 16 with Comparative Example that the liquid crystal cannot be injected into the liquid crystal cell as a whole in Comparative Example in which the transparent layer 10 is not formed but can be injected into the liquid crystal cell as a whole in Examples 1 to 16 in which the transparent layer 10 is formed. The liquid crystal injection time becomes shorter when the thickness d2 of the transparent layer 10 of the display portion 31 becomes greater and reaches substantially a constant value beyond the thickness s of the shading film 19. It has also been found out that the liquid crystal display apparatuses of Examples 2 to 4, 6 to 8, 10 to 12 and 14 to 16 in which the gap w is 3 μm, 5 μm or 8 μm and the transparent layer 10 is not disposed at a part of the non-display portion 30 have a shorter liquid crystal injection time than the liquid crystal display apparatuses of Examples 1, 5, 9 and 13 in which the gap w is 0.0 μm and the transparent layer 10 is disposed at all portions of the non-display portion 30.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A liquid crystal display apparatus comprising:
   a first substrate having on one surface thereof a plurality of pixel electrodes for driving a liquid crystal, a plurality of driving devices so arranged as to correspond to the pixel electrodes, respectively, for controlling a potential of the pixel electrodes, and wiring electrically connected to the driving devices;
   a second substrate so arranged as to oppose the first substrate while facing the one surface of the first substrate having the pixel electrodes thereon; and
   a liquid crystal layer formed by injecting the liquid crystal between the first and second substrates,
   wherein the first substrate has a non-display portion in which the driving devices and the wiring are disposed and which is not used for display and a display portion which is a portion other than the non-display portion and is used for display, and the second substrate has a transparent layer disposed on at least a portion thereof corresponding to the display portion and wherein the transparent layer on the second substrate is not provided in at least part of the non-display portion where the driving devices and wiring are provided so that a gap in the transparent layer is provided in an area corresponding to where the driving devices and wiring are provided.

2. The liquid crystal display apparatus of claim 1, wherein a thickness t1 of the liquid crystal layer of at least a part of the non-display portion is 0.48 times or more of a thickness t2 of the liquid crystal layer of the display portion (t1≧0.48t2).

3. The liquid crystal display apparatus of claim 1, wherein the transparent layer is formed of a resin.

4. The liquid crystal display apparatus of claim 1, wherein the second substrate further has a shading film on a portion of the surface thereof facing the first substrate which portion corresponds to the non-display portion of the first substrate.

5. A liquid crystal display apparatus comprising:
   a first substrate having on one surface thereof a plurality of pixel electrodes for driving a liquid crystal, a plurality of driving devices so arranged as to correspond to the pixel electrodes, respectively, for controlling a potential of the pixel electrodes, and wiring electrically connected to the driving devices;
   a second substrate so arranged as to oppose the first substrate while facing the one surface of the first substrate having the pixel electrodes thereon; and
   a liquid crystal layer formed by injecting the liquid crystal between the first and second substrates,
   wherein the first substrate has a non-display portion in which the driving devices and the wiring are disposed and which is not used for display and a display portion which is a portion other than the non-display portion and is used for display, and the second substrate has a transparent layer disposed on at least a portion of a surface thereof which surface faces the first substrate, the portion corresponding to the display portion out of the display portion and the non-display portion;

wherein the transparent layer is disposed in portions of the surface of the second substrate facing the first substrate which portions corresponds to the display portion and the non-display portion, respectively, and the thickness d1 of the transparent layer disposed on at least a part of the portion corresponding to the non-display portion is smaller than the thickness d2 of the transparent layer on the portion corresponding to the display portion (d1<d2).

6. A liquid crystal display apparatus comprising:
a first substrate having on one surface thereof a plurality of pixel electrodes for driving a liquid crystal, a plurality of driving devices so arranged as to correspond to the pixel electrodes, respectively, for controlling a potential of the pixel electrodes, and wiring electrically connected to the driving devices;
a second substrate so arranged as to oppose the first substrate while facing the one surface of the first substrate having the pixel electrodes thereon; and
a liquid crystal layer formed by injecting the liquid crystal between the first and second substrates,
wherein the first substrate has a non-display portion in which the driving devices and the wiring are disposed and which is not used for display and a display portion which is a portion other than the non-display portion and is used for display, and the second substrate has a transparent layer disposed on at least a portion of a surface thereof which surface faces the first substrate, the portion corresponding to the display portion out of the display portion and the non-display portion;
wherein the transparent layer is not disposed in at least a part of the portion corresponding to the non-display portion.

7. A liquid crystal display apparatus comprising:
a first substrate having on one surface thereof a plurality of pixel electrodes for driving a liquid crystal, a plurality of driving devices so arranged as to correspond to the pixel electrodes, respectively, for controlling a potential of the pixel electrodes, and wiring electrically connected to the driving devices;
a second substrate so arranged as to oppose the first substrate while facing the one surface of the first substrate having the pixel electrodes thereon; and
a liquid crystal layer formed by injecting the liquid crystal between the first and second substrates,
wherein the first substrate has a non-display portion in which the driving devices and the wiring are disposed and which is not used for display and a display portion which is a portion other than the non-display portion and is used for display, and the second substrate has a transparent layer disposed on at least a portion of a surface thereof which surface faces the first substrate, the portion corresponding to the display portion out of the display portion and the non-display portion;
wherein the second substrate further has a shading film on a portion of the surface thereof facing the first substrate which portion corresponds to the non-display portion of the first substrate; and
wherein the transparent layer is not disposed in at least a part of the portion corresponding to the non-display portion, and the difference Δd (Δd=d2−s) of the thickness d2 of the transparent layer of the portion corresponding to the display portion and the thickness s of the shading film satisfies the following formula when the thickness of the driving device is 0.2 to 0.4 μm, the thickness t2 of the liquid crystal layer of the display portion is 1.0 to 5.0 μm and the thickness s of the shading film is 0.5 to 2.0 μm.

$$-1.5 \ \mu m < \Delta d \leq 2.4 \ \mu m \tag{1}$$

8. The liquid crystal display apparatus of claim 7, wherein the difference Δd (Δd=d2−s) satisfies the following formula (2):

$$0 \ \mu m = \Delta d \leq 1.0 \ \mu m \tag{2}$$

9. The liquid crystal display apparatus of claim 4, wherein the plurality of pixel electrodes are arranged in matrix with predetermined gaps thereamong to constitute a pixel electrode matrix,
two adjacent rows of the pixel electrode matrix are arranged in parallel,
two adjacent columns of the pixel electrode matrix are arranged in parallel, and
the shading films are arranged at positions between the columns of the pixel electrode matrix in such a fashion as to extend in a direction parallel to the column direction of the pixel electrode matrix.

10. The liquid crystal display apparatus of claim 4, wherein the plurality of pixel electrodes are arranged in matrix with predetermined gaps thereamong to constitute a pixel electrode matrix,
two adjacent rows of the pixel electrode matrix are arranged in parallel,
two adjacent columns of the pixel electrode matrix are arranged in parallel, and
the shading films are arranged at positions between the rows of the pixel electrode matrix in such a fashion as to extend in a direction parallel to the row direction of the pixel electrode matrix, and are arranged at positions between the columns of the pixel electrode matrix in such a fashion as to extend in a direction parallel to the column direction of the pixel electrode matrix.

11. The liquid crystal display apparatus of claim 4, wherein the plurality of pixel electrodes are arranged in matrix with predetermined gaps thereamong to constitute a pixel electrode matrix,
two adjacent rows of the pixel electrode matrix are arranged in such a fashion that pixel electrodes in the adjacent rows are laterally offset from one another,
two adjacent columns of the pixel electrode matrix are arranged in parallel, and
the shading films are arranged at positions between the rows of the pixel electrode matrix in such a fashion as to extend in a direction parallel to the row direction of the pixel electrode matrix, and are arranged at positions between the columns of the pixel electrode matrix in such a fashion as to extend along the column direction of the pixel electrode matrix.

12. The liquid crystal display apparatus of claim 1, wherein the transparent layer has a mean transmission factor of at least 80% in a visible ray region.

13. The liquid crystal display apparatus of claim 1, wherein the thickness of the transparent layer is 2.0 μm or below.

14. The liquid crystal display apparatus of claim 1, wherein the driving devices are thin film transistors (TFTs).

15. The liquid crystal display apparatus of claim 1, wherein the transparent layer is an insulating layer that is not a color filter layer.

16. A liquid crystal display apparatus comprising:
a first substrate having on one surface thereof a plurality of pixel electrodes for driving a liquid crystal, a plurality of switching elements so arranged as to correspond to the pixel electrodes, respectively, for controlling the pixel electrodes, and bus lines electrically connected to the switching elements;

a second substrate opposing the first substrate; and a liquid crystal layer between the first and second substrates, wherein the first substrate comprises a non-display portion in which the switching elements and at least part of the bus lines are disposed and which is not used for display, and a display portion which is a portion other than the non-display portion and is used for display, wherein the second substrate comprises a common electrode and a transparent layer disposed on at least a portion thereof corresponding to the display portion, and wherein the transparent layer on the second substrate is not provided in at least part of the non-display portion where at least parts of the switching elements and/or bus lines are provided so that a gap in the transparent layer is provided in an area corresponding to where at least parts of the switching elements and/or bus lines are provided.

17. The liquid crystal display apparatus of claim 16, wherein the driving devices are thin film transistors (TFTs).

18. The liquid crystal display apparatus of claim 16, wherein the transparent layer is an insulating layer that is not a color filter layer.

* * * * *